United States Patent [19]

Holton et al.

[11] Patent Number: 5,381,512
[45] Date of Patent: Jan. 10, 1995

[54] METHOD AND APPARATUS FOR SPEECH FEATURE RECOGNITION BASED ON MODELS OF AUDITORY SIGNAL PROCESSING

[75] Inventors: Thomas Holton, San Francisco; Steven D. Love, Castro Valley; Stephen P. Gill, Atherton, all of Calif.

[73] Assignee: Moscom Corporation, Pittsford, N.Y.

[21] Appl. No.: 903,729

[22] Filed: Jun. 24, 1992

[51] Int. Cl.⁶ .......................... G10L 5/00; G10L 7/06; G10L 9/10
[52] U.S. Cl. .................... 395/2.41; 395/2.11; 395/2.16; 395/2.12
[58] Field of Search ...................... 395/2, 11, 24, 2.11, 395/2.16, 2.14, 2.12, 2.41, 2.64, 2.68; 381/41–50

[56] References Cited

U.S. PATENT DOCUMENTS

| 2,938,079 | 5/1960 | Flanagan | 381/50 |
| 4,932,062 | 6/1990 | Hamilton | 381/43 |
| 5,095,904 | 3/1992 | Seligman et al. | 128/420.6 |
| 5,155,802 | 10/1992 | Mueller et al. | 395/24 |

OTHER PUBLICATIONS

Seneff, "A Joint Synchrony/Mean-Rate Model of Auditory Speech Processing", Academic Press Limited, 1988, pp. 101–111.
Ghitza, "Auditory Neural Feedback as a Basis for Speech Processing", IEEE ICASSP, 1988, pp. 91–94.
Kates, "A Time-Domain Digital Cochlear Model", IEEE Trans. on Signal Processing, vol. 39, No. 12, Dec. 1991, pp. 2573–2592.
Cheng et al., "Automatic and Reliable Estimation of Glottal Closure Instant and Period", IEEE Trans. on ASSP, vol. 37, No. 12, Dec. 1989, pp. 1805–1815.
Kishi, "The Properties and Configuration of the Short Time DFT Hilbest Transformers", IEEE 1989, pp. 1019–1022.
Pei et al., "Relationship Among Digital One/Half Band Filters, Low/High Order Differentiators and Discrete/Differentiating Hilbest Transformers", IEEE 1991, pp. 1657–1660.
Liu et al., "An Analog Integrated Speech Front-End Based on the Auditory Periphery", IEEE 1991, pp. II–861 to II–864.
Nguyen et al., "A Physiology Motivated Front-End for Speech Recognition", IEEE 1991, pp. II–503→II–508.
Kates, "An Adaptive Cochlear Model", IEEE 1991, pp. 3621–3624.
Wu et al., "Specialized Physiology-Based Channels for the Detection of Articulatory-Acoustic Events: A Preliminary Scheme & Its Performance", IEEE 1989, pp. 2013–2016.
Friedman, "Detection and Frequency Estimation of Narrow-Band Signals by Means of the Instantaneous-Frequency Distribution (IFD)", IEEE 1988, pp. 71–76.
Beet et al., "Improved Speech Recognition Using a Reduced Auditory Representation", BCC 1988, pp. 75–78.

Primary Examiner—David D. Knepper
Attorney, Agent, or Firm—Owen, Wickersham & Erickson

[57] ABSTRACT

A stimulus waveform is processed using a model of the human auditory system to provide a plurality of output waveforms. Each output waveform corresponds to excitation at different locations along the basilar membrane in the cochlea, and matches the narrow frequency bandwidth, short time response, and wave propagation characteristics of the human cochlea. Primary feature detection is achieved by comparing response waveforms and their spatial and time derivatives to predetermined stereotypes. Secondary feature detection is achieved by comparing spatial and temporal patterns of primary features with patterns stereotypical of human speech elements.

28 Claims, 21 Drawing Sheets

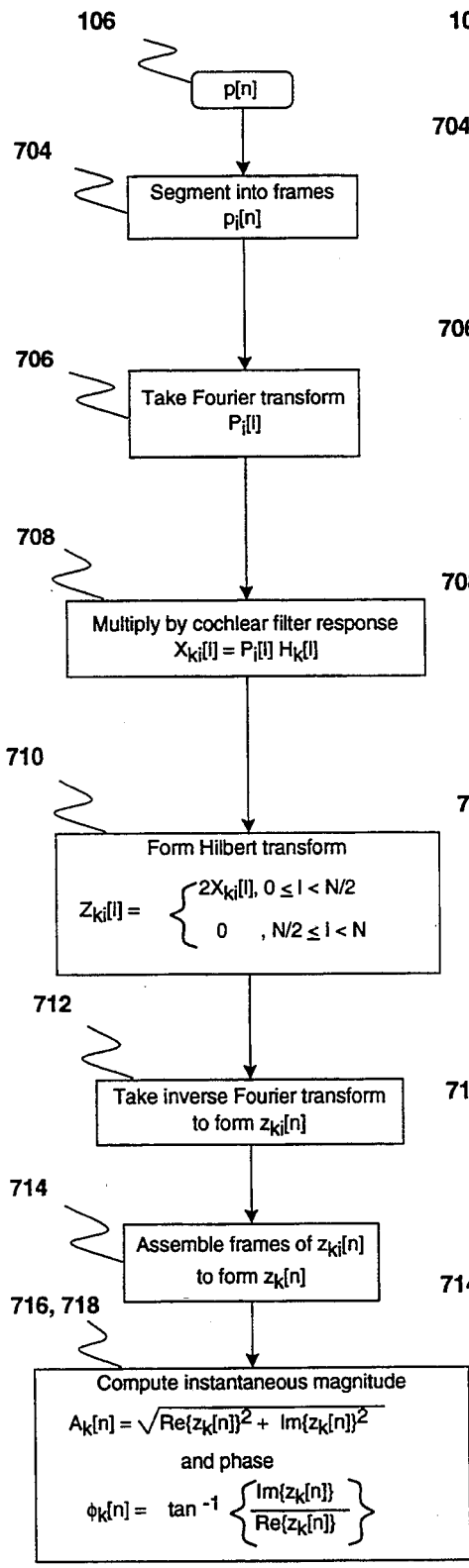
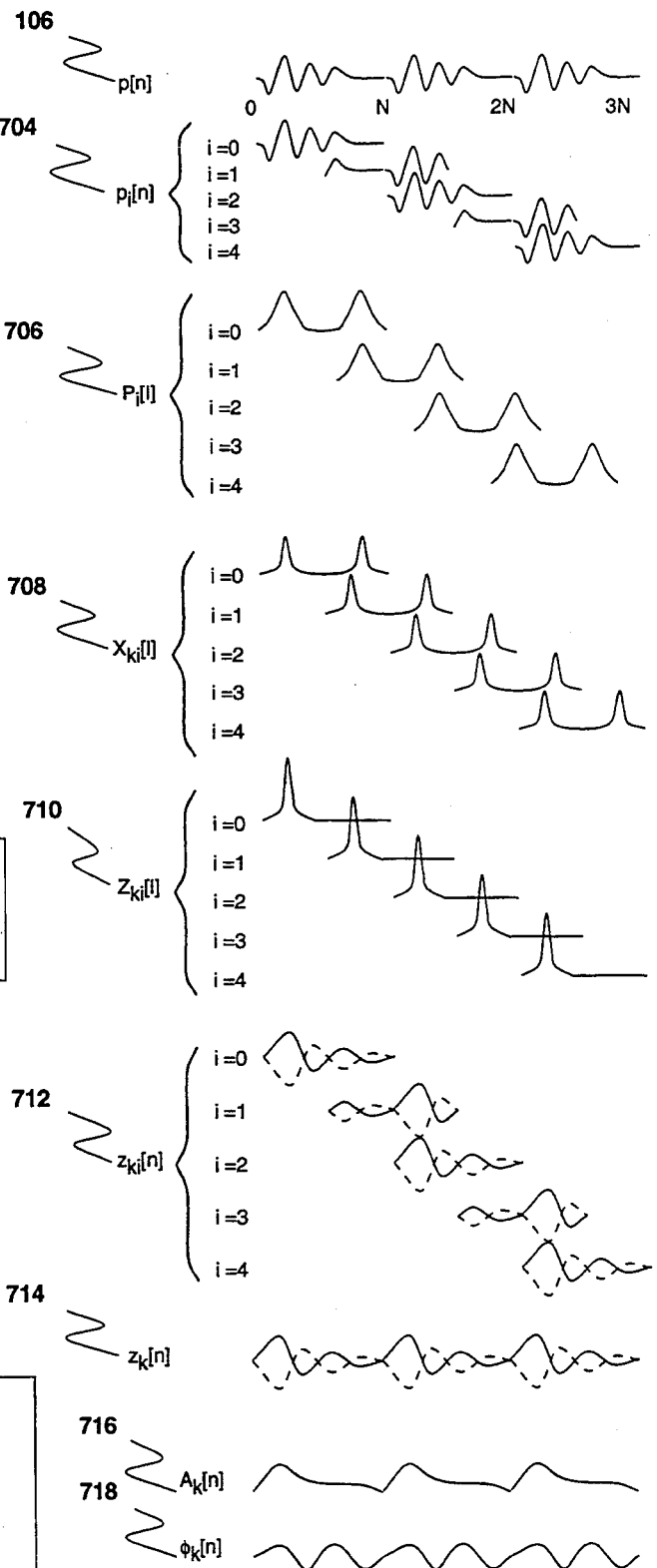
Figure 7A
Figure 7B

METHOD AND APPARATUS FOR SPEECH FEATURE RECOGNITION BASED ON MODELS OF AUDITORY SIGNAL PROCESSING

FIELD OF THE INVENTION

This invention relates to the area of signal processing generally, and particularly to the processing of speech by methods designed to detect linguistically important features for the purpose of speech coding, recognition, categorization and compression and for speaker verification and identification.

BACKGROUND OF THE INVENTION

Almost all current technology for signal processing for applications in the areas of speech recognition and speaker verification or identification is based on a variant of the frequency spectrogram, which is a representation of the energy in a signal as a function of frequency and time. While spectrographic processing was originally implemented by means of analog electronic hardware, including analog filter banks (e.g. the voice print), currently, spectral analysis is primarily implemented using the techniques of digital signal processing. The methods of spectral analysis include fast Fourier transformation (FFT), power spectral density (PSD) analysis, extraction of linear predictive coding (LPC) and cepstral coefficients. Other methods include processing by digital filter banks comprising filters designed by standard methods and filters whose design is purportedly based on some feature of the response of the auditory system. Spectrographic processing is usually applied with the aim of extracting important linguistic features from the speech signal such as the frequencies and times of occurrence of the formants. These speech features are often obtained by comparing the spectrographic patterns to templates or rules. Other conventional signal processing techniques are used to detect speech features. For example, autocorrelation functions are used to extract the pitch of a voiced utterance; zero-crossing profiles are used to discriminate between voiced and unvoiced segments of speech (Schafer, R. W. and Rabiner, L. R. (1978): *Digital Processing of Speech Signals.* Englewood Cliffs (N.J.): Prentice-Hall).

In general, conventional methods of speech processing suffer from several well-known problems:

Susceptibility to noise. Because the profile of spectral energy that constitutes the spectrogram is sensitive to anything that changes the relative magnitude of in-band energies, spectrographic representations can be severely degraded in situations of practical interest, such as the presence of high background or line noise;

Sensitivity to spectral shaping or bandwidth reduction. The characteristics of the communication channel can affect the spectrum of the input signal, thereby altering the profile of spectral energy, and distorting the spectrogram;

Non-selectivity for speech. Spectrographic techniques measure the frequency profile of signal energy irrespective of the source of that energy. They are not inherently selective for speech signals. Sources of signal energy such as line and environmental noise or non-speech signals such as music or tones create spectrographic patterns that can result in the mis-identification of relevant speech parameters;

Difficulty in estimating formant information. Conventional speech processing methods often have difficulty in estimating the pitch and formant frequencies of a voiced utterance. Speech is a temporally and spectrally complex waveform. Voiced portions of speech comprise epochs of wide spectral bandwidth (corresponding to the glottal, or pitch, pulses) alternating with epochs characterized by a more discrete frequency spectrum (corresponding to the formant frequencies). For spectrographic schemes aimed at the extraction of formant frequencies, the energy in the glottal pulse represents a confounding element. Techniques well known to the art, such as cepstral analysis and pitch-synchronous spectral extraction, have been employed in an attempt to separate the pitch from formant information;

Difficulty in estimating pitch. Speech is non-stationary and non-periodic. In voiced segments of speech, pitch is rarely constant, and autocorrelation techniques for the extraction of pitch, which essentially measure periodicity, can be inaccurate;

Sensitivity to segmentation of input data. In spectrographic sound analysis methods, sound data are usually segmented or windowed into frames (generally 10 to 20 milliseconds long) for analysis. The onset and duration of the frame can affect the accurate localization of spectrographic features in the time and frequency domains. For small frame sizes, spectrographic methods can follow the dynamic character of the speech, but with reduced frequency resolution, whereas for larger frame sizes, the frequency resolution improves at the expense of the resolution of the dynamic time-domain characteristics. Accurate time and frequency localization of formants is difficult because the formant frequencies can vary between adjacent glottal pulses occurring less than 5 milliseconds apart.

Several schemes have been disclosed in the prior art to process speech using methods specifically derived from an analysis of signal processing in the human auditory system. U.S. Pat. No. 4,536,844 issued to Richard F. Lyon on Aug. 20, 1985 discloses a method and apparatus for simulating auditory response information where the input signals are analyzed by a filter-bank comprising an array of high-order filters, each created from a cascade of linear, time-invariant, second-order digital filter sections followed by a stage of rectification and nonlinear dynamic range compression (automatic gain control). While this process purports to produce a representation similar to the human neural response, the resulting response does not, in fact, correspond to the measured experimental data from auditory-nerve fibers (Pickles, J. O. (1988): *Introduction to the Physiology of Hearing.* 2nd edition. London: Academic Press). Similar processing schemes are also described in the literature (Seneff, S. (1985): A joint synchrony/mean-rate model of auditory speech processing. *Journal of Phonetics* 16, 55–76; Kates, J. M. (1991): A time-domain digital cochlear model. *IEEE Transactions on Signal Processing* 39, 2573–2592.) All of these approaches generate an essentially spectral representation of speech.

U.S. Pat. No. 4,905,285, issued to Jont B. Allen et al. on Feb. 27, 1990 also discloses a method based on a model that purports to represent the frequency distribution of human neural response. In this method, the speech signal is analyzed by a bank of filters whose frequency response is derived from a mathematical model of the motion of the basilar membrane. The time waveform which constitutes the output of each spectral band is passed through a series of threshold detectors. The times between successive threshold crossings of detectors are measured and accumulated into an interval histogram. Interval histograms for a plurality of spectral bands are then combined to produce an ensemble histogram. From this histogram, a profile of the dominant average frequency components of an input signal is generated by means of conventional signal processing techniques (inverse Fourier transformation and autocorrelation). U.S. Pat. No. 4,075,423 issued to M. J. Martin et al. on Feb. 21, 1978 discloses a similar scheme based on accumulating a histogram of frequency patterns of detected waveform peaks. Spectrographic processing schemes based on threshold crossings of detected waveform peaks are also well documented in the literature (Niederjohn, R. J. (1985): A zero-crossing consistency method for formant tracking of voiced speech in high noise levels. *IEEE Transactions of Acoustics, Speech and Signal Processing*, vol ASSP-33, 2; Ghitza, O. (1985): A measure of in-synchrony regions in the auditory nerve firing patterns as a basis of speech vocoding. *Proceedings International Conference, Acoustics Speech and Signal Processing*.)

There are several significant disadvantages and problems with the neural threshold-crossing methods of the prior art that limit their applicability. Chief among these are the issues of temporal granularity and computational intractability. Threshold-crossings of the neural response model occur only at discrete intervals, which can be spaced milliseconds apart in model fibers with low center frequencies; hence, spectral estimates obtained from the histograms of threshold crossings will be temporally coarse or granular. Computing the complete response of the neural model fibers requires the solution of the nonlinear cochlear model equations for a plurality of parallel channels. The computational load of performing these calculations in real-time or near real-time can be prohibitive. Finally, the neural threshold-crossing methods are not speech specific and thus do not result in the identification of unique speech features.

The present invention provides a novel signal processing system based on signal processing by the auditory system that overcomes these and other problems of the prior art.

SUMMARY OF THE INVENTION

This invention describes novel means for analyzing and parameterizing speech based on a model of signal processing by the human auditory system. The implementations of this invention extract information relevant to the efficient detection and recognition of important features of speech. Specifically, they provide robust, noise-immune, speech-specific detection of glottal pulses and formants with simultaneously high resolution in the time and frequency domains. The implementations of this invention differ fundamentally from conventional signal-processing methods of the prior art. For example, whereas conventional spectrographic representations are based on measuring the energy in a plurality of narrow frequency bands, the representations of the present invention are based on detecting temporal patterns of the response of a plurality of adjacent frequency channels over a restricted period of time.

Here we disclose three implementations of the invention. The first implementation, which is termed the neural-correlation implementation, is based on an analysis of a model of signal processing by the auditory system, whose implementation is described in Appendix A. In this implementation, glottal pulses and formants are determined from temporal patterns of firings of groups of adjacent auditory-nerve fibers of the model. Although the neural-correlation implementation is not the preferred implementation, it is described first because it most clearly illustrates the principal features of the signal processing approach that is used in this invention, and facilitates the subsequent description of the details of other implementations.

The second implementation of the invention, which is termed the phase-coherence implementation, is the preferred implementation. This implementation is based on the observation, derived from the model of signal processing by the auditory system, that essential temporal characteristics of the patterns of neural firing of each channel are preserved in temporal and spatial derivatives of the phase of motion of the basilar-membrane component of the model. In this implementation, glottal pulses and the time and frequency localization of formants are robustly determined from spatially and temporally local patterns of phase correlation in the output of groups of channels.

In the third implementation of the invention, termed the instantaneous-frequency implementation, speech features are detected from patterns present in histograms of the instantaneous frequency of response summed from a number of channels.

In general terms, the basic principal of this invention in all its three implementations is as follows:

Sound is analyzed using a model of the human cochlea which simulates the waveform propagation characteristics of the basilar membrane. Our preferred model is implemented as an array of filters, the frequency and phase response of each of these filters being chosen to substantially match waveform propagation characteristics at equally spaced haircell locations along the length of the basilar membrane of the cochlea.

The response sequences that are computed for the output of the filter channels depend on the implementation. In the phase-coherence implementation, the response quantity that is computed for each filter is the instantaneous phase of the output of the filter. In the instantaneous-frequency implementation, the response quantity is the instantaneous frequency of response. In the neural-correlation implementation, the response quantity is a non-linear and time-varying transformation of the instantaneous amplitude of the output of the filter; this transformation is designed to emulate the response of auditory-nerve fibers to the stimulus. The response sequences that are computed for the output of the filter channels depend on the implementation. In the phase-coherence implementation, the response quantity that is computed for each filter is the instantaneous phase of the output of the filter. In the instantaneous-frequency implementation, the response quantity is the instantaneous frequency of response. In the neural-correlation implementation, the response quantity is a non-linear and time-varying transformation of the instantaneous amplitude of the output of the filter; this transformation is designed to emulate the response of auditory-nerve fibers to the stimulus.

The response sequences computed from the array of filters are then processed by an array of primary feature detectors which are designed to emulate the signal processing characteristics of cells in the brainstem and auditory cortex. The essential attribute of these detectors is that they detect local spatial and temporal patterns of the response of the filters. For example, in the neural-correlation implementation, the primary feature detectors detect patterns in the response of an array of filters that correspond to patterns of the discharge of groups of auditory-nerve fibers. In the phase-coherence implementation, the primary feature detectors detect patterns in spatial and temporal derivatives of the instantaneous phase. In the instantaneous-frequency implementation, the primary feature detectors detect patterns of the instantaneous frequency from a group of channels. The primary feature detectors include local impulse detectors, which detect impulsive features in the stimulus, and local synchrony detectors, which detect synchronous regions of the response. These detectors respond to local spatial and temporal patterns of neural firing or spatio-temporal derivatives of basilar-membrane motion. In the context of these detectors, the term "local" means that each primary feature detector in the array detects only patterns of the response of filter channels over a restricted range of channels and over a restricted interval of time.

The outputs of the primary feature detectors are processed by an array of secondary feature detectors which detect patterns in the response of the array of primary feature detectors. Secondary feature detectors include the local formant detector, which detects the times of occurrence and the frequencies of the formants in speech, and the global pulse detector, which detects the times of occurrence of the glottal pulses. Whereas the term "local" indicates that the response of each channel of the secondary detector depends only upon a restricted range of channels of the primary feature detector stage, the term "global" means that the response of each channel of the secondary detector depends upon a large number of channels the primary feature detector stage.

This invention differs fundamentally from conventional signal processing methods of the prior art in that patterns of wave propagation characteristics in the human cochlea are used as the basis for extracting important features of the input stimulus waveform. Specifically, this invention utilizes combined spatial and time differentials from auditory model output waveforms to detect stereotypical patterns of human speech. Conventional filter bank methods for signal processing, such as those that use the frequency spectrogram, consider only energy or time correlation of individual channels without establishing relationships between channels. We show that the relationships between channels arising from wave propagation characteristics of the human cochlea provide unique new information for robustly detecting features of human speech.

Specifically, this invention improves upon prior-art methods in a number of important respects:

They are insensitive to additive noise;
They are insensitive to spectral shaping or bandwidth reduction of the input;
They are selective for the detection of speech features such as pitch and formant information;
They do not require critical data segmentation;
They simultaneously show high temporal and frequency resolution;
Results can be obtained in a computationally efficient manner.

Further objects and advantages of this invention will become apparent from the consideration of the drawings and ensuing descriptions.

BRIEF DESCRIPTION OF THE DRAWINGS

FIG. 7A is a flow chart of the signal processing operations performed by the cochlear signal-processing stage, useful for determining the magnitude and phase of basilar membrane response.

FIG. 7B is a schematic diagram of the waveforms that result from the processing operations depicted in FIG. 7A illustrating the operation of the cochlear signal-processing stage according to the invention.

DETAILED DESCRIPTION OF THE EMBODIMENTS

We first describe the neural-correlation implementation because it illustrates the principal features of the signal processing approach that is used in this invention, and facilitates our subsequent description of the details of the phase-coherence and instantaneous-frequency implementations.

Figure 1:
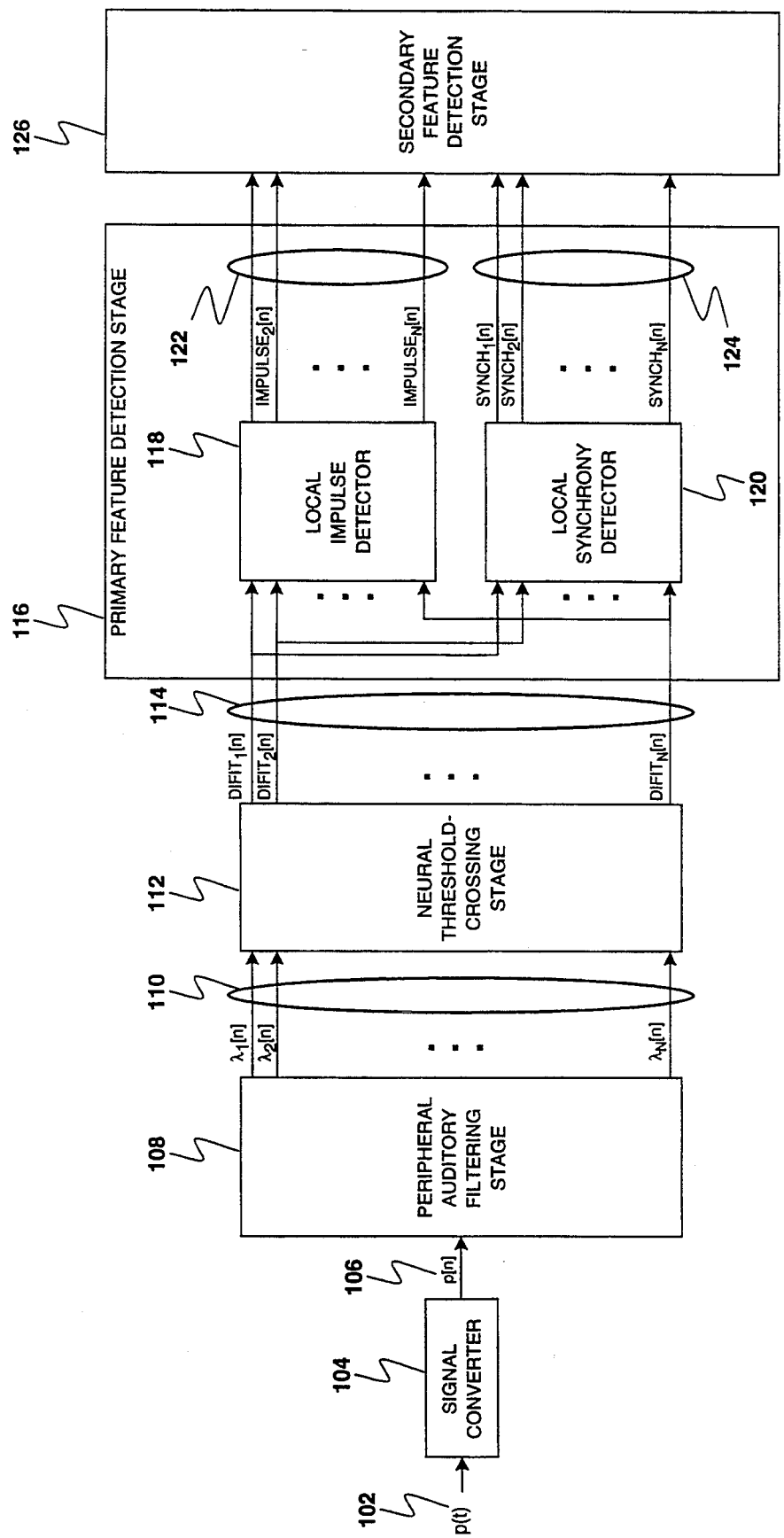
FIG. 1 is a block diagram of the signal-processing stages that characterize the neural-correlation implementation of the invention.

With reference to the drawings, FIG. 1 is a block diagram of the signal-processing stages that characterize the neural-correlation implementation of the invention. In this implementation, an input sound p(t) 102 is transformed by a signal converter 104 into a discrete-time input sound sequence, p[n] 106. In this embodiment, p(t) 102 is bandlimited to less than 4 kHz and is digitized at a sample rate of 8 kHz; however, it is understood that the bandwidth need not be limited to 4 kHz, and that other sampling rates can be used in the signal converter. Input sequence p[n] 106 is then passed through a peripheral auditory filtering stage 108 which may be implemented using a processor arrangement incorporating, for example, a type MC68040 microprocessor and a type DSP56001 digital signal processor. The programming instructions implemented on these processors are derived from a biophysical model of signal processing by the peripheral auditory system whose implementation is described in Appendix A. The output of peripheral auditory filtering stage 108 is an array of sequences, $\lambda_k[n]$ 110. These sequences represent the probability density functions of discharge of the primary afferent auditory-nerve fibers, where the channel number, k, represents the spatial dimension of the response. In this embodiment, there are 120 channels, $0 \leq k \leq 119$, representing the response of locations linearly spaced along the basilar membrane, with characteristic frequencies ranging from 250 Hz (for k=0) to 3400 Hz (for k=119).

Figure 2B:
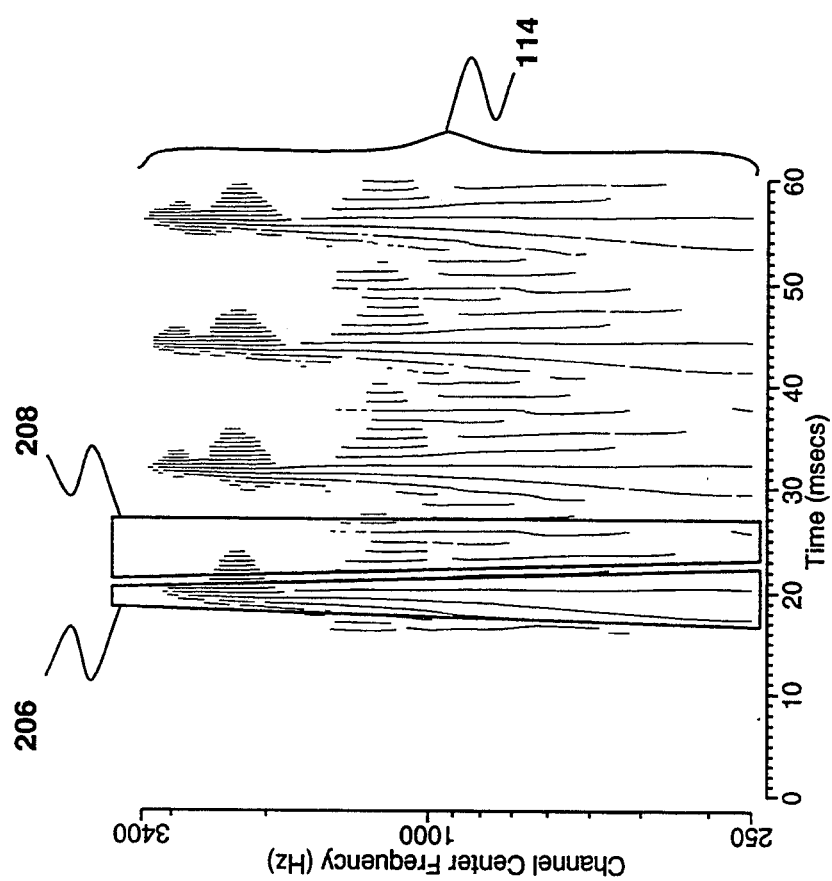
FIG. 2B is a plot of the neural threshold crossings derived from the data of FIG. 2A produced in accordance with the method illustrated in FIG. 3.
Figure 2A:
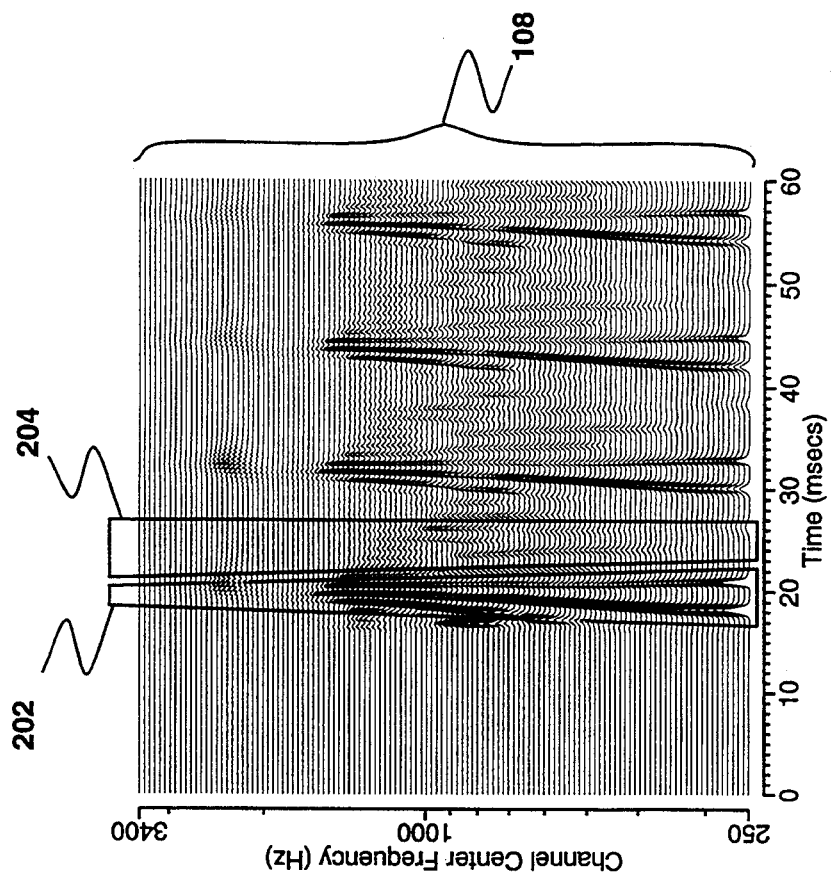
FIG. 2A is a plot of response waveforms generated by the peripheral auditory filtering stage of the auditory model illustrated in FIG. 1 in response to a speech utterance, /a/.

FIG. 2A is a plot of the response waveforms generated by the peripheral auditory filtering stage 108 of the auditory model illustrated in FIG. 1 in response to a speech utterance, /a/. The response to this utterance comprises an array of sequences $\lambda_k[n]$ 110, and consists of two distinct spatio-temporal patterns occurring in alternation, which we term an impulsive epoch 202 and a synchronous epoch 204. In the impulsive epoch 202, each channel tends to respond at the characteristic frequency of that channel. In synchronous epoch 204 which follows, there are several distinct groups of adjacent channels that respond in synchrony with each other at a frequency that corresponds to a proximal formant frequency. One of the principal features of this invention is that linguistically important speech features such as the location of the glottal pulses and formant frequencies can be determined by designing robust detectors to find these impulsive and synchronous epochs.

The output of all of the channels of the peripheral auditory filtering stage (i.e. $\lambda_k[n]$ 110) pass to a neural threshold-crossing stage 112 which produces output sequences $DIFIT_k[n]$ 114 indicating the times at which channel k is most likely to respond to sound. The output of neural threshold-crossing stage 112 goes to processing stages which represent feature detection by the central auditory system, the brainstem nuclei and the auditory cortex. A primary feature detection stage 116 comprises a local impulse detector 118 that detects patterns of nerve-fiber firings that correspond to the impulsive interval, and a local synchrony detector 120 that detects patterns of synchronous firings by groups of nerve fibers which correspond to the synchronous interval. Each local feature detector has a plurality of input sequences $DIFIT_k[n]$ 114 and a plurality of output sequences. Local impulse detector 118 generates an array of output sequences, $IMPULSE_k[n]$ 122, and local synchrony detector 120 generates an array of output sequences $SYNCH_k[n]$ 124. These detectors are termed local to indicate that the value of each output sequence at any time depends only upon a restricted subset of the channels of the input sequences over a small window of time. For example, the value of the output sequence for channel $k_0$ at time $n_0$ (i.e. $IMPULSE_{k_0}[n_0]$) may depend only on values of the input sequence, $\lambda_k[n]$, for a small range of channels near $k_0$ and for a small range of time near $n_0$. The output sequences of the primary detectors go to secondary feature detection stage 126 that comprises a plurality of feature detectors which perform the detection and identification of formants, vowels and glottal pulses. These secondary detectors are described in detail in connection with the phase-coherence implementation of the invention.

While it is possible to detect speech features directly from the correlation of the sequences representing the probability density functions of neural discharge, $\lambda_k[n]$ 110, the correlation process is simplified by processing $\lambda_k[n]$ 110 with neural threshold-crossing stage 112 to determine sequences $DIFIT_k[n]$ 114 that mark threshold crossings of the neural response: the times at which the probability of neural response of each channel increases rapidly following periods of comparative low response.

Figure 3:
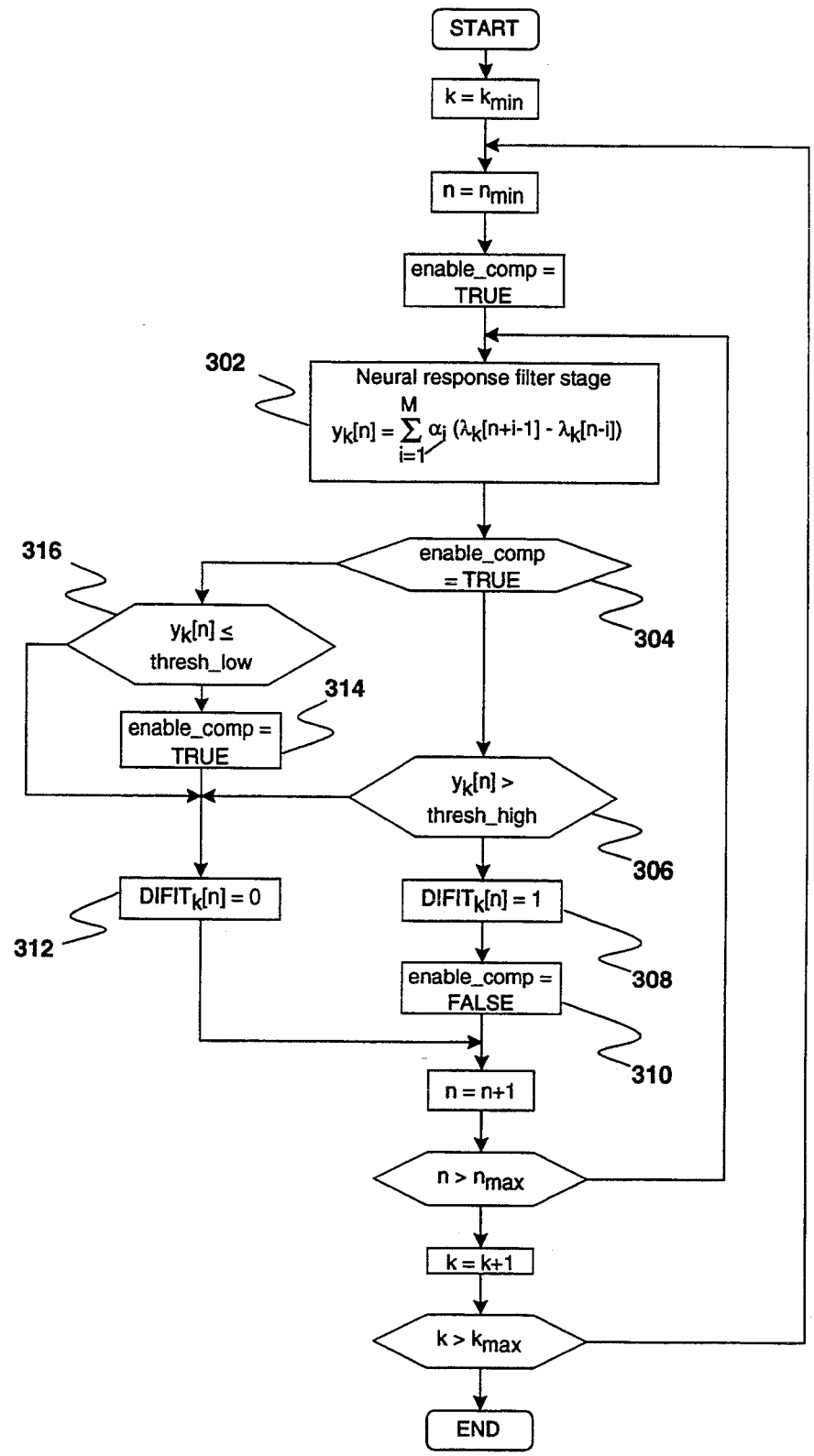
FIG. 3 is a flow chart of an arrangement for determining the threshold crossings of the neural response used in conjunction with the neural-correlation implementation of the invention.

FIG. 3 is a flow of an arrangement for determining threshold crossings of the neural response. The neural input sequences, $\lambda_k[n]$ 110, are computed by peripheral auditory filtering stage 108 for every channel, $k_{min} \leq k \leq k_{max}$ where $k_{min}$ and $k_{max}$ represent the low and high frequency channels of the filter bank, and for every time point in the utterance, $n_{min} \leq n \leq n_{max}$, where $n_{min}$ and $n_{max}$ represent the beginning and end of the input sequence. Each neural input sequence 110 is processed by a neural response filter stage 302 to produce a filtered neural response sequence, $y_k[n]$, which accentuates those portions of the neural response that correspond to sharp increases in the rate of neural response. In the preferred embodiment, for every channel k and time n, $y_k[n]$ is the smoothed derivative of $\lambda_k[n]$ computed by applying a discrete-time finite impulse response filter of order 2M which has the form:

$$y_k[n] = \sum_{i=1}^{M} \alpha_i(\lambda_k[n + i - 1] - \lambda_k[n - i])$$

The filtered neural response, $y_k[n]$, is processed by a neural response threshold comparator to produce a threshold sequence $DIFIT_k[n]$ that has a value of one at the onset of a sharp increase in the neural response and a value of zero otherwise. In the embodiment depicted in FIG. 3, the neural threshold comparator is implemented as a threshold comparator with hysteresis. With reference to FIG. 3, if the threshold comparator is enabled (i.e. if enable_comp=TRUE 304) and the value of $y_k[n]$ exceeds thresh_high 306, the value of the output sequence $DIFIT_k[n]$ is set to one 308 and the threshold comparator is disabled by setting enable_comp=FALSE 310. Otherwise, the value of $DIFIT_k[n]$ is set to zero 312. The threshold comparator is re-enabled (enable_comp=TRUE 314) when the value of $y_k[n]$ falls below thresh_low 316. The method diagrammed in FIG. 3 results in output sequences, $DIFIT_k[n]$, that correspond to the times at which a fiber is likely to fire in response to a sound; however, it should be clear that the determination of peak times of neural firing can also be accomplished using any of a number of methods known to the art; for example, by finding the peak or threshold-crossings of $\lambda_k[n]$ or filtered versions of $\lambda_k[n]$. The description of the embodiment in FIG. 3 is not meant to exclude these embodiments.

FIG. 2B shows $DIFIT_k[n]$ 114, the threshold-crossings of $\lambda_k[n]$ produced in accordance with the method described in conjunction with FIG. 3. In this figure one can clearly see that the response to a voiced utterance consists of two distinct spatio-temporal patterns occurring in alternation, an impulsive epoch 206 and a synchronous epoch 208. The pattern of threshold-crossings of the neural response in the impulsive epoch is characteristically splayed. During this epoch, each channel tends to respond at its own characteristic frequency. In the initial portion of this epoch it is generally true that, if an impulse occurs in sequence $DIFIT_k[n]$ 114 for some channel $k=k_0$ at some time $n=n_0$ (i.e. $DIFIT_{k_0}[n_0]=1$), then a response will occur earlier in time for a number of adjacent channels of lower characteristic frequency (that is, $DIFIT_k[n]=1$ for $k<k_0$ and $n<n_0$), and later in time for a number of adjacent channels of higher characteristic frequency (that is, $DIFIT_k[n]=1$ for $k>k_0$ and $n>n_0$). In the final portion of this epoch, the above relationship of impulses is reversed. This response pattern is characteristic of the peripheral auditory filtering stage's response to impulsive sounds in general and to plosives and pitch pulses of voiced speech in particular.

Figure 4:
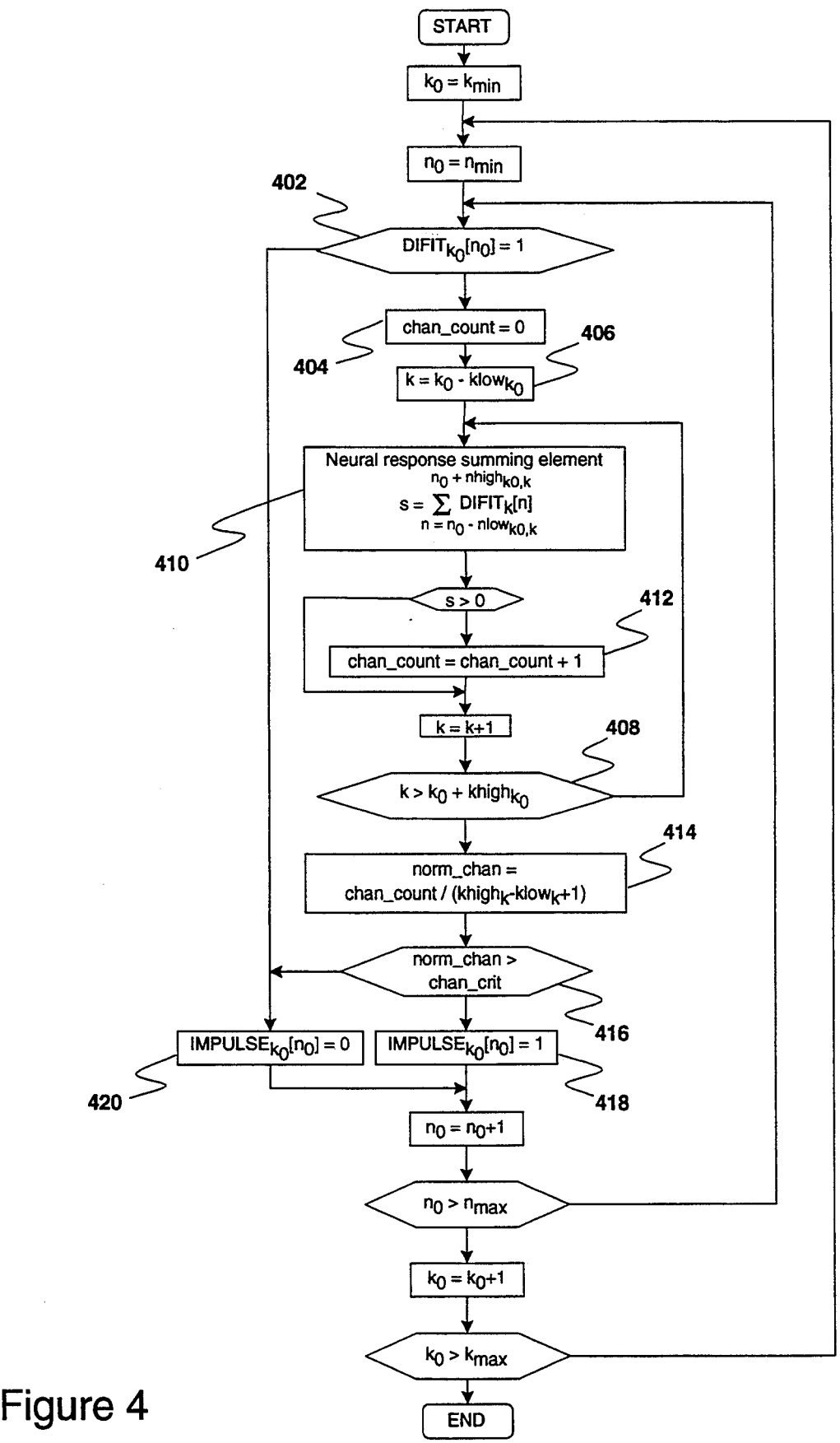
FIG. 4 is a flow chart illustrating a method for implementing the local impulse detector of the neural-correlation implementation of the invention.

FIG. 4 is a flow chart illustrating a method for implementing the local impulse detector 118 of the neural-correlation implementation of the invention. The input sequences, $DIFIT_k[n]$ 114, are computed in accordance with the method described in connection with FIG. 3 for every channel, $k_{min} \leq k \leq k_{max}$ and for every time, $n_{min} \leq n \leq n_{max}$. For each channel, local impulse detector 118 detects a pattern of neural activity wherein a number of adjacent channels respond in sequence. This detection of a response pattern by local impulse detector 118 emulates the function of a "neural-coincidence detector" neuron. Such a neuron responds when a number of afferent fibers discharge simultaneously within a brief period of time. Central neurons which function as coincidence detectors are widely documented, and there is specific evidence in the auditory system of cells that function as coincidence detectors and that are sensitive to time differences of neural input at high frequencies.

With reference to FIG. 4, if a response occurs in channel $k_0$ of the input sequence at time $n_0$ (i.e. $DIFIT_{k_0}[n_0]=1$ 402), a channel counter 404 is initialized to zero, chan_count=0. This counter is used to count the number of channels adjacent to $k_0$ that respond within a response-time window with respect to $n=n_0$. For channel $k_0$, the adjacent channels are defined to range from $k_0-klow_{k_0}$ to $k_0+khigh_{k_0}$. This formulation allows the number of adjacent channels to depend upon $k_0$. In the embodiment depicted in FIG. 4, the values of $klow_{k_0}$ and $khigh_{k_0}$ are chosen to correspond to approximately one critical band centered around $k_0$. A response-time window for each channel is defined to be a range of time values around $n=n_0$, from $n_0-nlow_{k_0,k}$ to $n_0+nhigh_{k_0,k}$. This formulation allows the size of the response-time window for the channel k, to depend upon both $k_0$ and k. In the embodiment depicted in FIG. 4, $nlow_{k_0,k}$ and $nhigh_{k_0,k}$ depend only upon k, and the response-time window is approximately equal to one characteristic period, that is, the reciprocal of the characteristic frequency of channel k. With reference to FIG. 4, for each channel between $k=k_0-klow_{k_0}$ 406 and $k=k_0+khigh_{k_0}$ 408, a neural response summing element 410 sums the responses, $DIFIT_k[n]$, within the time window $n_0-nlow_{k_0,k} \leq n \leq n_0+nhigh_{k_0,k}$ to form response sum s.

$$s = \sum_{n=n_0-nlow_{k_0,k}}^{n_0+nhigh_{k_0,k}} DIFIT_k[n]$$

If the value of the response sum s is greater than zero, at least one response has occurred in the response-time window, and the value of chan_count is incremented by one 412. When the responses of all channels in the range $k_0-klow_{k_0} \leq k \leq k_0+khigh_{k_0}$ have been surveyed, the value of chan_count indicates the number of adjacent channels (including channel $k_0$) that have at least one response in the appropriate response-time window. A normalized channel count norm_chan 414 is determined by dividing the value of chan_count by the total number of channels surveyed, $khigh_{k_0}-klow_{k_0}$. If the value of norm_chan is greater than a fractional acceptance criterion value, chan_crit 416, then a local impulse is defined to have occurred in channel $k_0$, and the value of the output sequence, $IMPULSE_{k_0}[n_0]$ is set to one 418. Otherwise $IMPULSE_{k_0}[n_0]$ is set to zero 420.

Figure 5A:
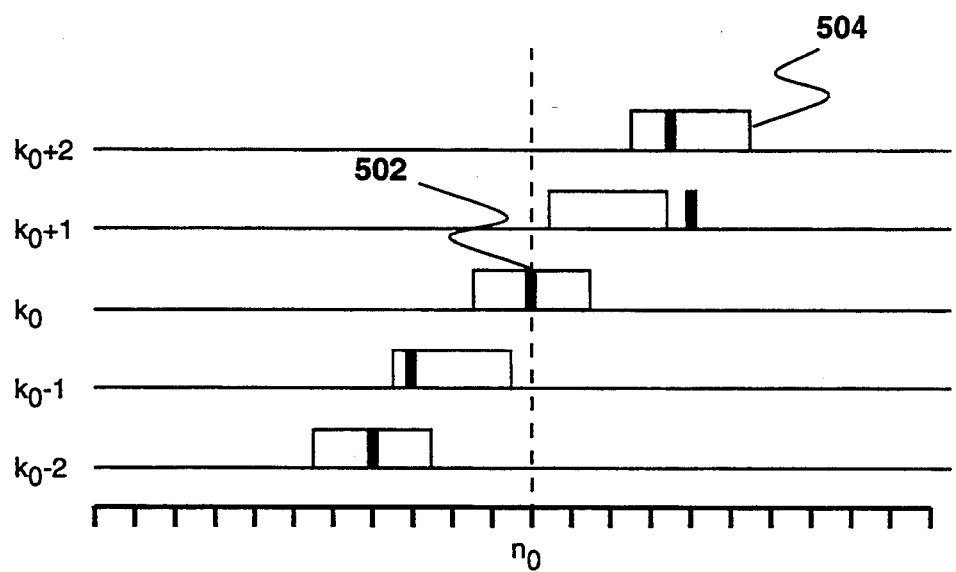
FIG. 5A is a schematic representation of the arrangement of time-response windows used in the local impulse detector of the neural-correlation implementation.

FIG. 5A is a schematic representation of the arrangement of time-response windows used in local impulse detector 118 of the neural-correlation implementation described with reference to FIG. 4. In this example, a response occurs in channel $k=k_0$ at time $n=n_0$ 502. For this channel, $khigh_{k_0}=2$ and $klow_{k_0}=2$. A set of shaded boxes 504 indicates the extent of the response-time window for each channel. Here, $nlow_{k_0,k}$ and $nhigh_{k_0,k}$ depend upon k. Responses occur within the response-time windows for four of the five channels surveyed, hence the value of channel counter 412 is chan__count=4 and the value the normalized channel count 414 is norm__chan=0.8. Thus, if the value of the fractional acceptance criterion, chan__crit 416 is no more than 0.8, the criterion for detection of a local impulse will have been met for channel $k=k_0$ at time $n=n_0$ and the value of the output sequence, IMPULSE$_{k_0}[n_0]$, will be set to one.

In the synchronous epoch 208 of FIG. 2B, there are several distinct groups of responding channels. Each group comprises a plurality of adjacent channels that respond in synchrony with each other at a frequency that corresponds to a proximal formant frequency. In general, a synchronous interval can be defined as that range of k and n for which a number of adjacent channels all respond at approximately the same time. The synchronous interval is detected by a primary feature detector, the local synchrony detector 120. This detector produces a response in output channel $k_0$ at time $n_0$ if a response occurs in sequence DIFIT$_k[n]$ 114 for channel $k=k_0$ at time $n=n_0$ (i.e. DIFIT$_{k_0}[n_0]=1$), and responses occur simultaneously in a number of adjacent channels of lower and higher characteristic frequencies (i.e., DIFIT$_k[n]=1$ for klow$_{k_0} \leq k \leq$ khigh$_{k_0}$ and nlow$_{k_0,k} \leq n \leq$ nhigh$_{k_0,k}$, where klow$_{k_0}$ and khigh$_{k_0}$ represent, respectively, the range of channels that are in synchrony and nlow$_{k_0,k}$ and nhigh$_{k_0,k}$ represent the times over which synchrony is assessed.

The local synchrony detector 120 in the neural-correlation implementation is identical to the local impulse detector 118 described in conjunction with FIG. 4, except that, whereas local impulse detector 118 detects the sequential pattern of response, local synchrony detector 120 detects a simultaneous pattern of response of a number of adjacent channels. The block diagram of the local synchrony detector 120 is therefore identical to that of local impulse detector 118 depicted in FIG. 4. The only differences are the values of the time-response windows for each channel, nlow$_{k_0,k}$ and nhigh$_{k_0,k}$, and possibly the range of adjacent channels surveyed for channel k: klow$_{k_0}$ and khigh$_{k_0}$. The output sequence for local synchrony detector 120 is denoted SYNCH$_k[n]$ 124 instead of IMPULSE$_k[n]$ 122.

Figure 5B:
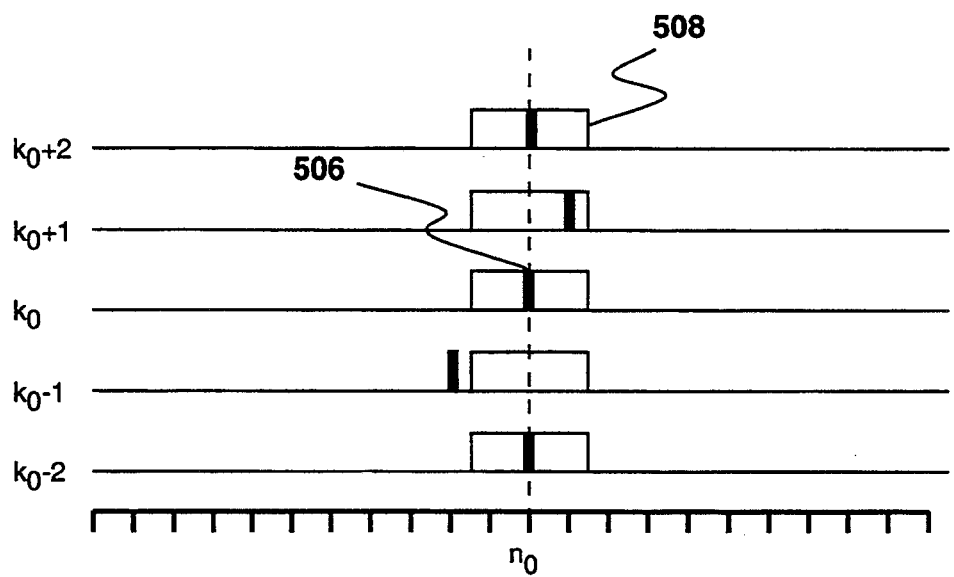
FIG. 5B is a schematic representation of the arrangement of time-response windows used in the local synchrony detector of the neural-correlation implementation.

FIG. 5B shows an example of the disposition of response-time windows for use in connection with local synchrony detector 120. In this example, a response occurs in channel $k=k_0$ at time $n=n_0$ 506. For this channel, khigh$_{k_0}=2$ and klow$_{k_0}=2$. A set of shaded boxes 508 indicate the extent of the response-time windows for each adjacent channel. Here, nlow$_{k_0,k}=$nhigh$_{k_0,k}=1$ for all $k_0$ and k, so the response-time windows for all adjacent channels are cotemporaneous. Responses occur within the response-time windows for four of the five channels surveyed, hence the value of channel counter 412 is chan__count=4 and the value of normalized channel count 414 is norm__chan=0.8. Thus, if the value of acceptance criterion chan__crit 416 is no more than 0.8, the criterion for detection of a local synchrony will have been met for channel $k=k_0$ at time $n=n_0$ and the value of the output sequence, SYNCH$_{k_0}[n_0]$, will be set to one.

The local impulse and synchrony detectors of the neural-correlation implementation represent a substantial improvement over prior art spectrographic methods; in the neural-correlation implementation, detection of features is temporally and spatially local and relatively unaffected by additive noise or spectral shaping of the input signal. However, there are two deficits with the neural-correlation implementation that limit its applicability: temporal granularity and computational intractability. These same deficits were discussed in connection with the prior-art method of Allen et al. (U.S. Pat. No. 4,905,285). Temporal granularity means that threshold-crossings of the neural response of each channel (i.e. DIFIT$_k[n]$ 114) occur only at discrete intervals, which can be spaced milliseconds apart in model channels with low center frequencies; hence, the response of local impulse and synchrony detectors, which require the input from several primary channels will be temporally coarse or granular. Computational intractability occurs because computing the complete response of the neural model channels (i.e. $\lambda_k[n]$ 110) requires the solution of linear and nonlinear cochlear model equations (as described in Appendix A) for 120 parallel channels in the preferred embodiment. The computational load of performing these calculations in real-time or near real-time is currently in excess of that permitted by even relatively large arrays of conventional general purpose CISC (e.g. type MC68040) RISC (e.g. type MC88100) or DSP (e.g. type MC56001) processors.

We now disclose details of the phase-coherence implementation of our invention. This implementation is preferred because it maintains the advantages of local detection of features such as local impulses and local synchrony, but improves upon the neural-correlation implementation by offering the additional advantages of fine temporal granularity and computational tractability. The significant improvements of the phase-coherence implementation result from the fact, which can be demonstrated from analysis of the peripheral auditory filtering stage 108 described in Appendix A, that the essential temporal information necessary for the detection of speech features such as the glottal pulses and formant frequencies is contained in correlations of $\Phi_k[n]$, the phase of the output of the cochlear-hydrodynamic stage of the auditory model 1910. Because $\Phi_k[n]$ can be computed with fine time resolution (equivalent to the sampling interval), the temporal granularity of the method can be arbitrarily fine. Because the cochlear-hydrodynamic stage 1910 of the auditory model is linear it is considerably simpler to implement than the complete model of the peripheral auditory system which includes substantial non-linear components. Hence, the computational efficiency of the phase-coherence implementation is also much improved.

Figure 6:
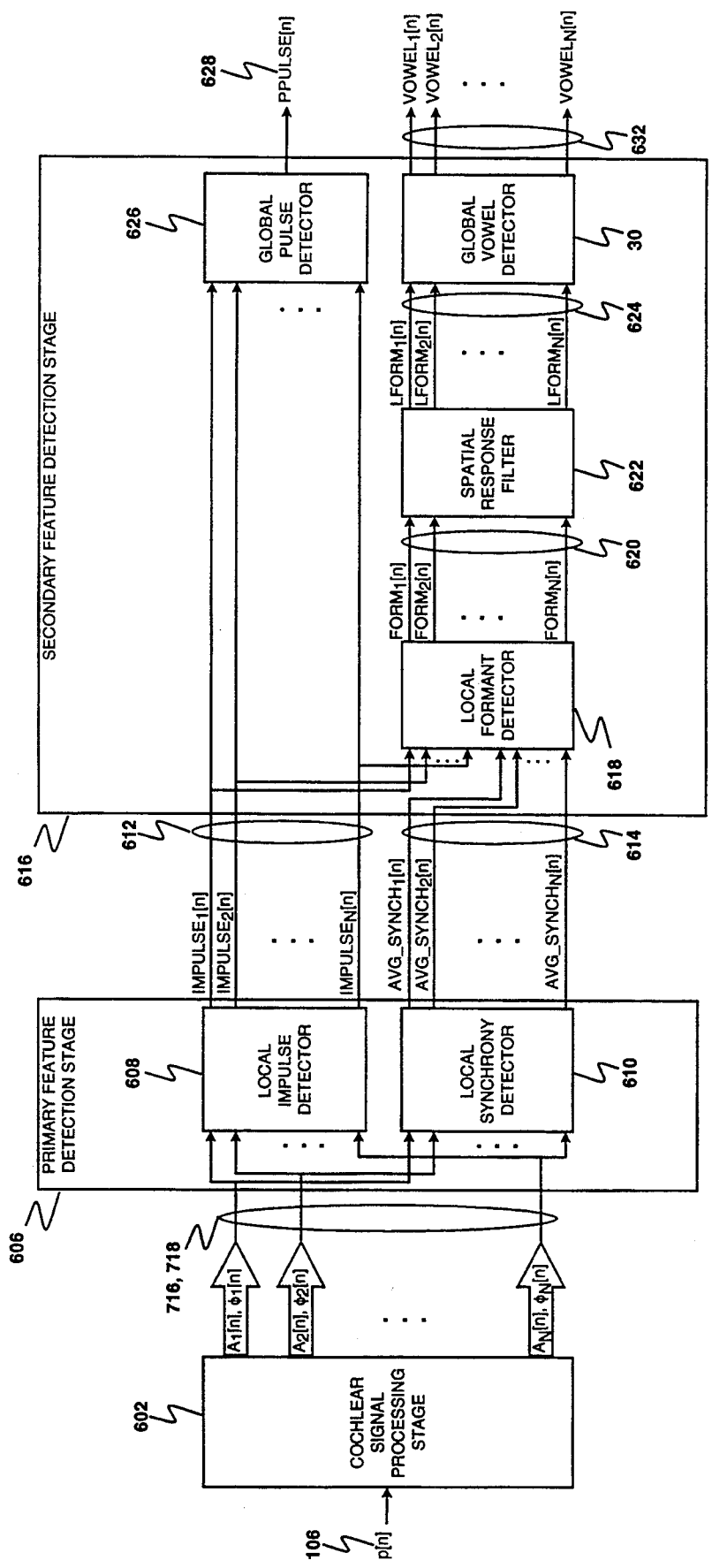
FIG. 6 is a block diagram of the signal-processing stages that characterize the phase-coherence implementation of the invention.

FIG. 6 is a block diagram of the signal-processing stages that characterize the phase-coherence implementation of the invention. In this implementation, input sound p(t) 102 is transformed by signal converter 104 into discrete-time input sound sequence, p[n] 106 as described in conjunction with FIG. 1. Then, sequence p[n] 106 is processed by a cochlear signal processing stage 602, which is a filter bank comprising a plurality of channels, each channel, k, with a cochlear filter response function $H_k[l]$. The cochlear signal processing stage 602, as well as the primary feature detection stage 606 and the secondary feature detection stage 616 to be described below, can be implemented using a processor arrangement incorporating, for example, a type MC68040 microprocessor and a type DSP56001 digital signal processor. The cochlear filter response functions of cochlear signal processing stage 602 summarize the signal processing operations characteristic of the outer 1904 and middle 1906 ear and cochlear hydrodynamics of the inner ear 1910 of the peripheral auditory filtering stage 108 which is described in Appendix A. The output of channel k of cochlear signal processing stage 602 is a pair of sequences representing the instantaneous magnitude, $A_k[n]$ 716, and phase, $\Phi_k[n]$ 718 of the response of one place on the basilar membrane of the cochlea to sound.

The instantaneous magnitude 716 and phase 718 sequences pass to a primary feature detection stage 606 which comprises a local impulse detector 608 of the phase-coherence implementation that detects patterns of spatial and temporal derivatives of the phase of basilar-membrane motion that correspond to the impulsive interval, and a local synchrony detector 610 of the phase-coherence implementation that detects patterns of spatial and temporal derivatives of the phase of the basilar-membrane motion that correspond to the synchronous interval. These local detectors are analogous to local impulse detector 118 and local synchrony detector 120 of the neural-correlation implementation described in connection with FIGS. 4 and 5. Each local feature detector of the phase-coherence implementation has a plurality of input sequences (i.e. $A_k[n]$ 716 and $\Phi_k[n]$ 718) and a plurality of output sequences. Local impulse detector 608 generates output sequences IMPULSE$_k$[n] 612, and local synchrony detector 610 generates sequences SYNCH$_k$[n] and AVG_SYNCH$_k$[n] 614. As discussed in connection with the neural-correlation implementation, these detectors are termed local to indicate that the value of each output sequence at any given time depends only upon a restricted subset of the channels of the input sequences over a small window of time.

The output sequences of primary feature detector stage 606 go to a secondary feature detector stage 616 which comprises a plurality of detectors. The secondary feature detectors include a local formant detector 618, which uses input from both local impulse detector 608 and local synchrony detector 610 to determine the spatio-temporal location of formants, producing an array of output sequences FORM$_k$[n] 620. A spatial response filtering stage 622 sharpens the frequency extent of the formants detected by local formant detector 616 and produces an array of output sequences LFORM$_k$[n] 624. The sequences LFORM$_k$[n] represent the output of a signal processing method which responds preferentially to voiced speech at the time and frequency of occurrence of the formants.

The secondary feature detection stage 616 includes global feature detectors for glottal pulses and vowels. These detectors are termed global to indicate that the value of each output sequence at any given time depends upon most or all of the channels of the input sequences over some period of time. A global glottal-pulse detector 626 uses information from local impulse detector 608 to determine the temporal location of the glottal pulses, and generates an output sequence PPULSE[n] 628. A global vowel detector 630 operates on the input from the formant spatial response filtering stage 622 to produce an array of outputs that denote the presence of vowels, VOWEL$_k$[n] 632.

FIG. 7A is a flow chart of the signal processing operations performed by cochlear signal processing stage 602 to obtain sequences of instantaneous magnitude, $A_k[n]$ 716, and instantaneous phase, $\Phi_k[n]$ 718. The operations diagrammed in this flow chart are particularly suited to implementation using a processor arrangement incorporating a type DSP56001 digital signal processor, though implementations incorporating a general purpose microprocessor, for example, a type MC68040 microprocessor, are not excluded. FIG. 7B is a schematic diagram of the waveforms that result from the processing operations depicted in FIG. 7A. In the preferred embodiment, the input sound p[n] 106 is segmented into frames N points in duration to form a framed input sequence, $p_i[n]$ 704, where the index i indicates the number of the frame and subsequent frames overlap by N/2 points. In the preferred embodiment, the sampling rate is approximately 8 kHz and N is 256 points, so each frame is approximately 32 milliseconds in duration. The discrete Fourier transformation of each frame of $p_i[n]$ 704 is taken using well-known fast Fourier transformation techniques to obtain a framed Fourier-transformed input sequence, $P_i[l]$ 706, where $0 \leq l \leq N$ is the frequency index of each transform frame (only the magnitude of $P_i[l]$ is shown in FIG. 7B). For each channel, k, the framed Fourier-transformed input sequence $P_i[l]$ 706 is multiplied by the cochlear filter frequency-response function for that channel, $H_k[l]$, $0 \leq l \leq N$, to form an array of framed Fourier-transformed cochlear output sequences, $X_{ki}[l]$ 708. Because the cochlear filter frequency-response functions are sharply bandpass, the filtered output sequence, $X_{ki}[n]$ can be described as the real part of a framed complex cochlear-filtered output sequence $Z_{ki}[n]$:

$$X_{ki}[n] = \text{Re}\{Z_{ki}[n]\} = \text{Re}\{A_{ki}[n]e^{\Phi_{ki}[n]}\}.$$

where $A_{ki}[n]$ is defined to be the instantaneous magnitude and $\Phi_{ki}[n]$ is defined to be the instantaneous phase. To derive $A_{ki}[n]$ and $\Phi_{ki}[n]$ for any channel, we use the fact that $Z_{ki}[l]$, the Fourier transform of $Z_{ki}[n]$, is the Hilbert transform of $X_{ki}[n]$ (Oppenheim, A. V. and Schafer, R. W. (1989): *Discrete-time Signal Processing*, Section 10.4. Englewood Cliffs (N.J.): Prentice-Hall). $Z_{ki}[l]$ is constructed from $X_{ki}[l]$, by setting the highest N/2 complex components of each frame of $X_{ki}[l]$ to zero and multiplying the remaining coefficients by two.

$$Z_{ki}[l] = \begin{cases} 2X_{ki}[l], & 0 \leq l < N/2 \\ 0, & N/2 \leq l < N. \end{cases}$$

Thus, the array of N-point framed complex sequences $Z_{ki}[n]$ 712 is obtained by taking the N-point inverse Fourier transform of all the frames of $Z_{ki}[l]$. In FIG. 7B, the real part of $Z_{ki}[n]$ is shown with solid lines and the imaginary part is shown with dashed lines. The frames of $Z_{ki}[n]$ are assembled using the well-known overlap-save technique with an overlap of N/2 to form a complex cochlear-filtered response, $Z_k[n]$ 714. Finally, the instantaneous magnitude, $A_k[n]$ 716 and phase, $\Phi_k[n]$ 718 are computed from $Z_k[n]$ 712 by rectangular-to-polar conversion:

$$A_k[n] = \sqrt{Re\{z_k[n]\}^2 + Im\{z_k[n]\}^2}$$

$$\phi_k[n] = \tan^{-1}\left[\frac{Im\{z_k[n]\}}{Re\{z_k[n]\}}\right]$$

In the preferred embodiment, the operations of Fourier transformation filtering are implemented on a highspeed, special purpose digital signal processor (e.g. type MC56001).

The instantaneous magnitude, $A_k[n]$ 716, and phase $\Phi_k[n]$ 718, of channel k can also be computed by other methods. For example, the complex output sequence, $Z_k[n]$ can be obtained by convolving the input sequence, p[n] 106 with the time-domain complex impulse response of the cochlear filter, $h_k[n]$. For each channel, $h_k[n]$ can be obtained by setting the highest N/2 complex points of the cochlear filter frequency-response function, $H_k[l]$ to zero, and computing the inverse Fourier transform.

Figure 8:
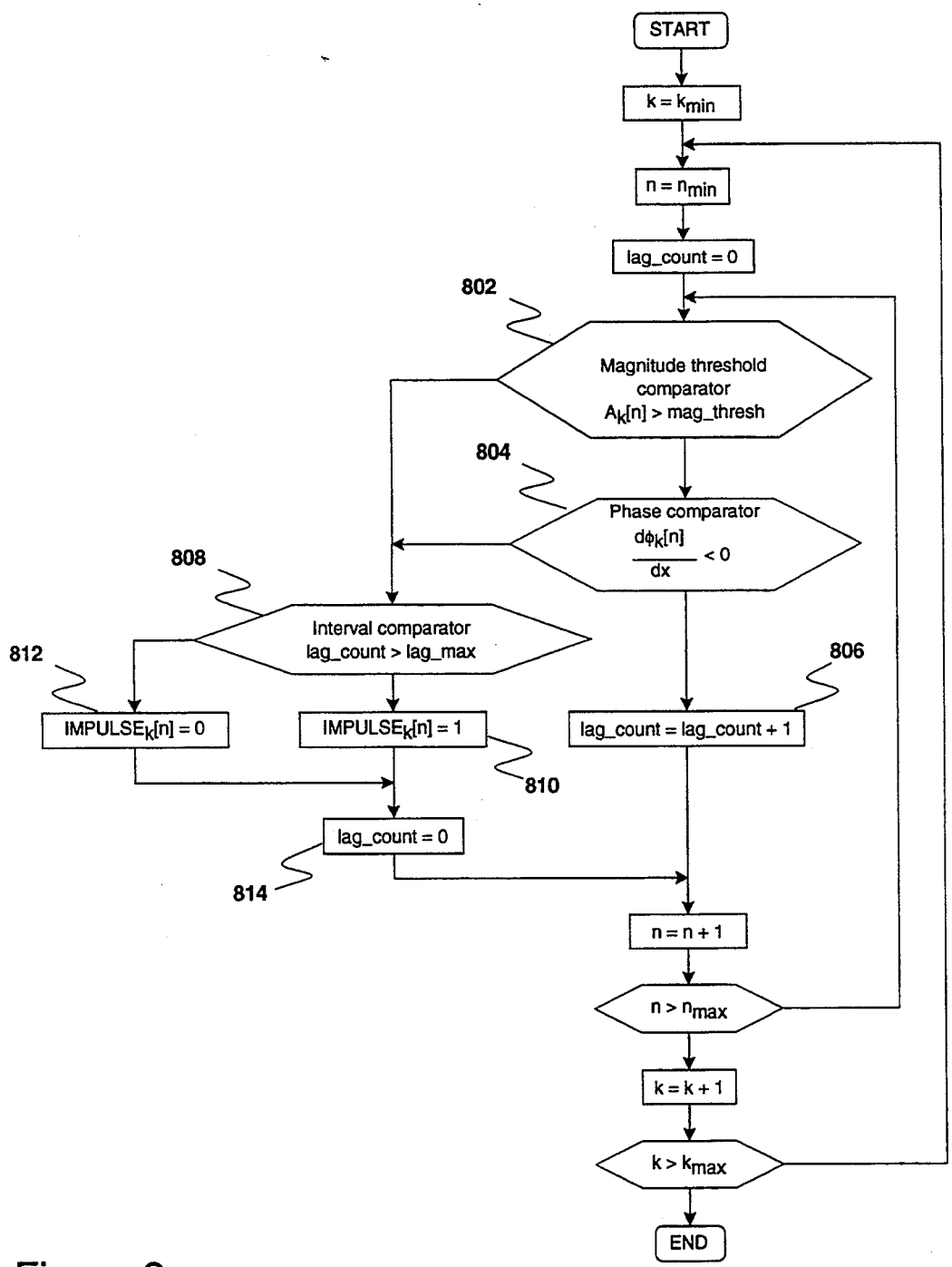
FIG. 8 is a flow chart illustrating a method for implementing the local impulse detector of the phase-coherence implementation.

FIG. 8 is a flow chart illustrating a method for implementing local impulse detector 608 of the phase-coherence implementation. The principle of local impulse detector 608 is to detect a stereotyped pattern of spatial and time derivatives of basilar-membrane phase velocity that correspond to the sequential pattern of neural activity evoked by an impulse such as a glottal pulse. In the phase-coherence implementation, information on the relative timing of adjacent groups of nerve fibers is derived from $d\Phi_k[n]/dx$, the spatial derivative of phase of basilar-membrane motion. Because adjacent channels in the preferred embodiment of cochlear signal processing stage 602 correspond to positions linearly spaced on the basilar membrane, dx is constant and $d\Phi_k[n]/dx$ is proportional to $d\Phi_k[n]/dk$. In the preferred embodiment, for computational simplicity we compute the spatial phase derivative from the forward or backward difference of two adjacent channels (e.g. $d\Phi_k[n]/dx = \Phi_k[n] - \Phi_{k-1}[n]$); however, other means of computing the spatial and temporal derivatives of response phase are not excluded. Since the phase of the motion of the linear cochlear-hydrodynamic stage 1910 for each channel reflects the phase of the non-linear cochlear model of neural firing, $\Phi_k[n]$ can be computed efficiently (with high computational tractability) and with high temporal resolution (low temporal granularity).

A local impulse is defined to occur in the channel $k=k_0$ at time $n=n_0$ if the phase velocity $d\Phi_k[n]/dx$ is negative for $n<n_0$ and becomes positive for $n>n_0$ while the spatio-temporal phase velocity, that is the derivative of the spatial phase velocity with respect to time, $d^2\Phi_k[n]/dxdt$, is greater than zero. The inputs to the local impulse detector 608 are the sequences of instantaneous magnitude, $A_k[n]$ 716 and instantaneous phase, $\Phi_k[n]$ 718, whose computation is discussed in connection with FIG. 7. For each channel, k, at each time, n, a magnitude threshold comparator 802 determines whether the magnitude $A_k[n]$ 716 exceeds a magnitude threshold, mag_thresh. If $A_k[n] >$ mag_thresh, then a phase comparator 804 tests whether the phase velocity of channel k is negative or positive. If the phase velocity is negative, a lag counter 806, lag_count is incremented by one. This lag counter determines the length of time during which phase velocity is negative. When the phase velocity becomes zero or positive, an interval comparator 808 determines whether the cumulative time during which phase velocity was negative (i.e. lag_count), exceeds a fixed value, lag_max. If so, an impulse is said to be detected on channel k and the value of an output impulse sequence, $IMPULSE_k[n]$ is set to one 810, otherwise $IMPULSE_k[n]$ is set to zero 812. Then lag_count is reset to zero 814, and the process is repeated for all times and channels.

In the preferred embodiment, phase comparator 804 tests only for positive or negative phase velocity and not for the condition of uniformly positive spatio-temporal phase velocity, $d^2\Phi_k[n]/dxdt$.

In a ramification of local impulse detector 608 of the phase-coherence implementation which is not shown, a more general phase comparator is implemented which requires not only that the phase velocity be negative (i.e. $d\Phi_k[n]/dx < 0$) for a period exceeding lag_max, but also that the spatio-temporal phase velocity be uniformly positive (i.e. $d^2\Phi_k[n]/dxdt > 0$). Furthermore, in the general phase comparator, the input to the phase comparator for each channel $k_0$ is the phase $\Phi_k[n]$ of a plurality of channels adjacent to $k_0$, not just the two channels of the preferred embodiment. The types of processing by the general phase comparator comprise linear and non-linear transformation of the input phase, as well as temporal and spatial derivatives of the input. That is, for channel $k_0$, the output of the general phase comparator, $PHASE\_COMP_{k_0}[n]$, has the form:

$$PHASE\_COMP\ k_0[n] = \sum_{k=k_{low}}^{k_{high}} f(\phi_k[n]),$$

where $k_{low}$ and $k_{high}$ represent the range of channels over which the phase comparison is made (which may be functions of $k_0$) and $f(\Phi_k[n])$ represents functions of phase that may include spatial derivatives of phase (e.g. $d\Phi_k[n]/dx$), temporal derivatives (e.g. $d\Phi_k[n]/dt$) and spatio-temporal derivatives (e.g. $d^2\Phi_k[n]/dxdt$).

Figure 9:
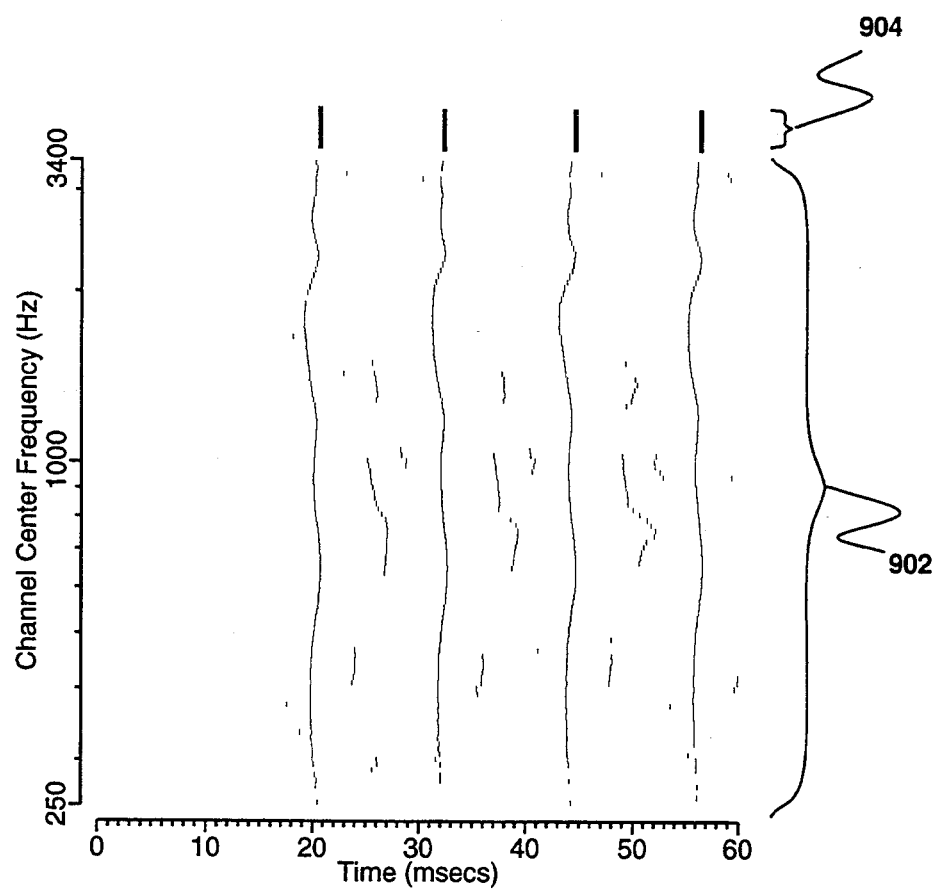
FIG. 9 is a plot of the response pattern to the utterance /a/ produced by the local impulse detector of the phase-coherence method in accordance with the method of FIG. 8, and the response pattern of the global pulse detector produced in accordance with the method of FIG. 15.

FIG. 9 is a plot of the response pattern to the utterance /a/ produced by 120 local impulse detectors of the phase-coherence method 608 in accordance with the method of FIG. 8. The responses of the local impulse detectors tend to occur at preferred times, forming a series of wavy lines 902 at intervals of the pitch periods.

An important attribute of local impulse detector 608 in the phase-coherence implementation is that the determination of output sequences, $IMPULSE_k[n]$ 608, is spatially and temporally local. This means that an impulse in channel k at time n is determined by examining only derivatives of spatial phase, $d\Phi/dx$, over a small number of channels around k, and only for a brief time interval around n. In the preferred embodiment, the spatial extent of the computation is less than a critical band and the temporal extent is about one millisecond, which is a small fraction of a pitch period. Because the computation of sequences $IMPULSE_k[n]$ 612 is based a local history of spatial derivatives of response phase, the output of local impulse detector 608 is highly insensitive to additive noise or spectral shaping of the input.

Figure 10:
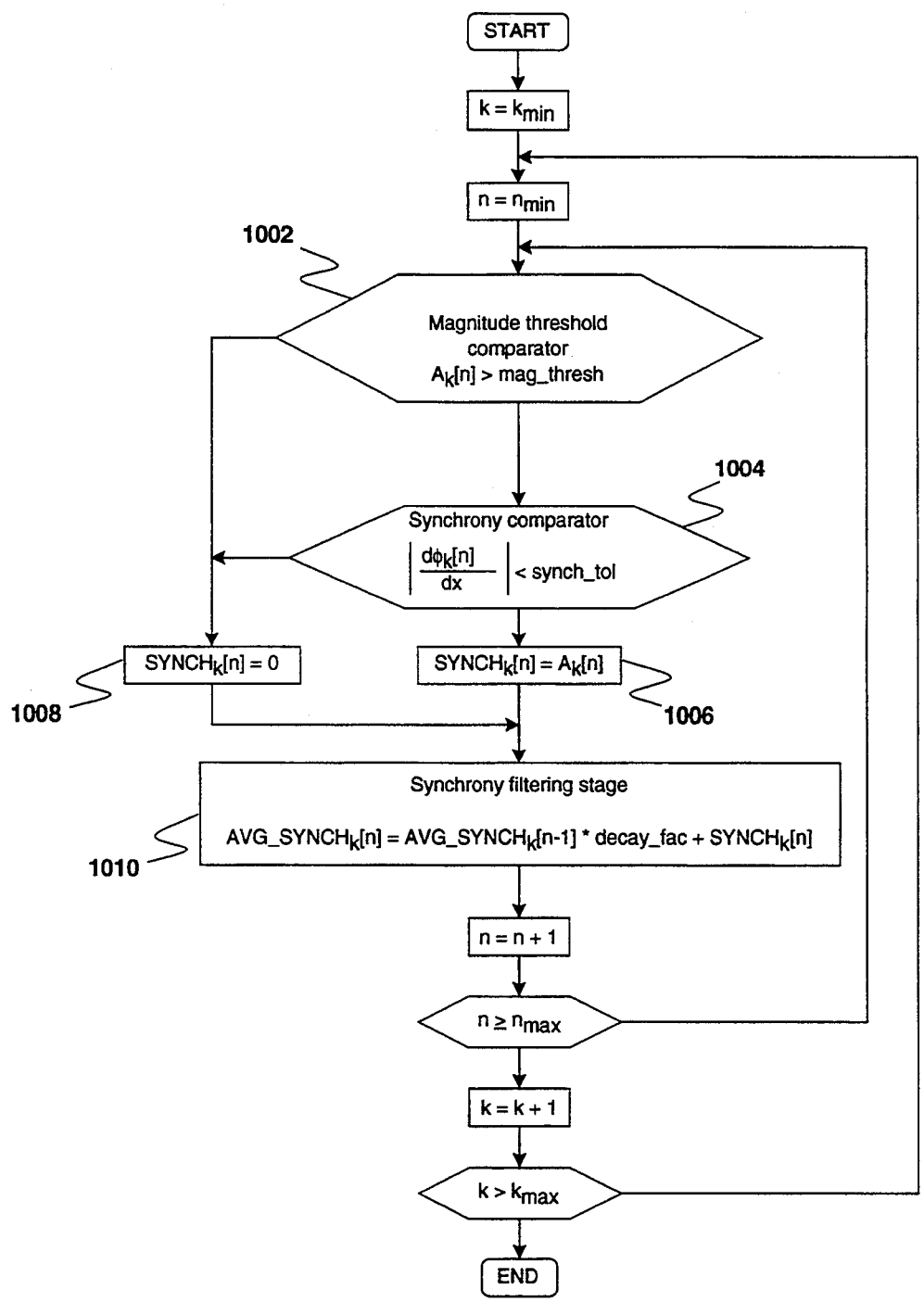
FIG. 10 is a flow chart illustrating a method for implementing the local synchrony detector of the phase-coherence implementation.

FIG. 10 is a flow chart illustrating a method for implementing local synchrony detector 610 of the phase-coherence implementation. The principle of local synchrony detector 610 is to detect a pattern of constant phase velocity on the basilar membrane that corresponds to the pattern of synchronous neural activity evoked by the formants. Local synchrony is defined to occur in channel k at time n if the phase velocity of a plurality of channels adjacent to k is similar, that is, the spatio-temporal phase velocity is nearly constant for a period of time. The inputs to local synchrony detector 610 are sequences of instantaneous magnitude, $A_k[n]$ 716 and phase, $\Phi_k[n]$ 718. For each channel, k, at each time, n, a magnitude threshold comparator 1002 determines whether magnitude $A_k[n]$ 716 exceeds a magnitude threshold, mag_thresh. If $A_k[n] >$ mag_thresh, then a synchrony comparator 1004 determines whether the spatial phase velocity is nearly zero. In the preferred embodiment, synchrony comparator 1004 is realized by an implementation which tests whether the phase velocities of two adjacent channels, k and k+1, are within a tolerance value, synch_tol, of each other. If $|d\Phi_k[n]/dx| <$ synch_tol, synchrony is said to be detected on channel k and the value of an output synchrony sequence, $SYNCH_k[n]$ is set to $A_k[n]$ 1006, otherwise $SYNCH_k[n]$ is set to zero 1008. A synchrony filtering stage 1010 filters sequence $SYNCH_k[n]$ to produce a filtered synchrony sequence, $AVG\_SYNCH_k[n]$ 614. In the preferred embodiment, a exponentially averaging filter is used:

$$AVG\_SYNCH_k[n] = AVG\_SYNCH_k[1] - {}^*decay\_fac + SYNCH_k[n],$$

where the exponential averager time constant, decay_fac, is a constant less than one. The synchrony filtering stage emulates the physiology of a cell acting as a leaky integrator, or averager. Cells with this property are well known and documented in the neurophysiological literature.

Figure 11:
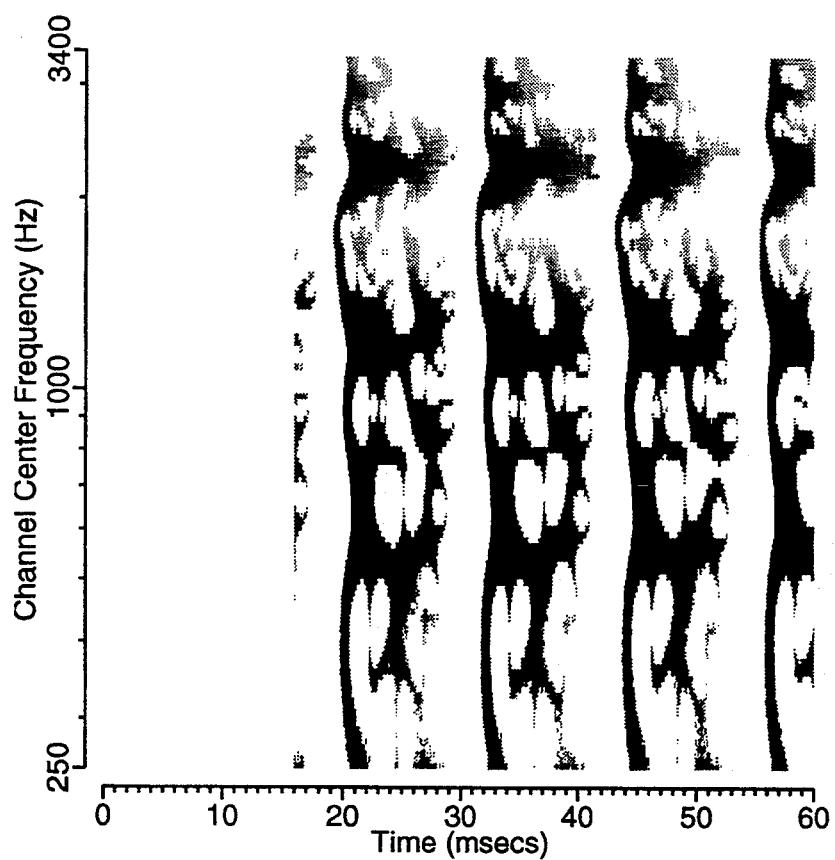
FIG. 11 is a plot of the response pattern to the utterance /a/ produced by the local synchrony detector of the phase-coherence implementation in accordance with the method of FIG. 10.

FIG. 11 is a plot of the response pattern to the utterance /a/ produced by the local synchrony detector 610 of the phase-coherence implementation. The sequences $SYNCH_k[n]$ are generated using the method described in conjunction with FIG. 10 using a value of synch_tol that corresponds to 10 μsec. The darkly shaded areas indicate spatio-temporal regions in which there is strong synchronous response.

Figure 12:
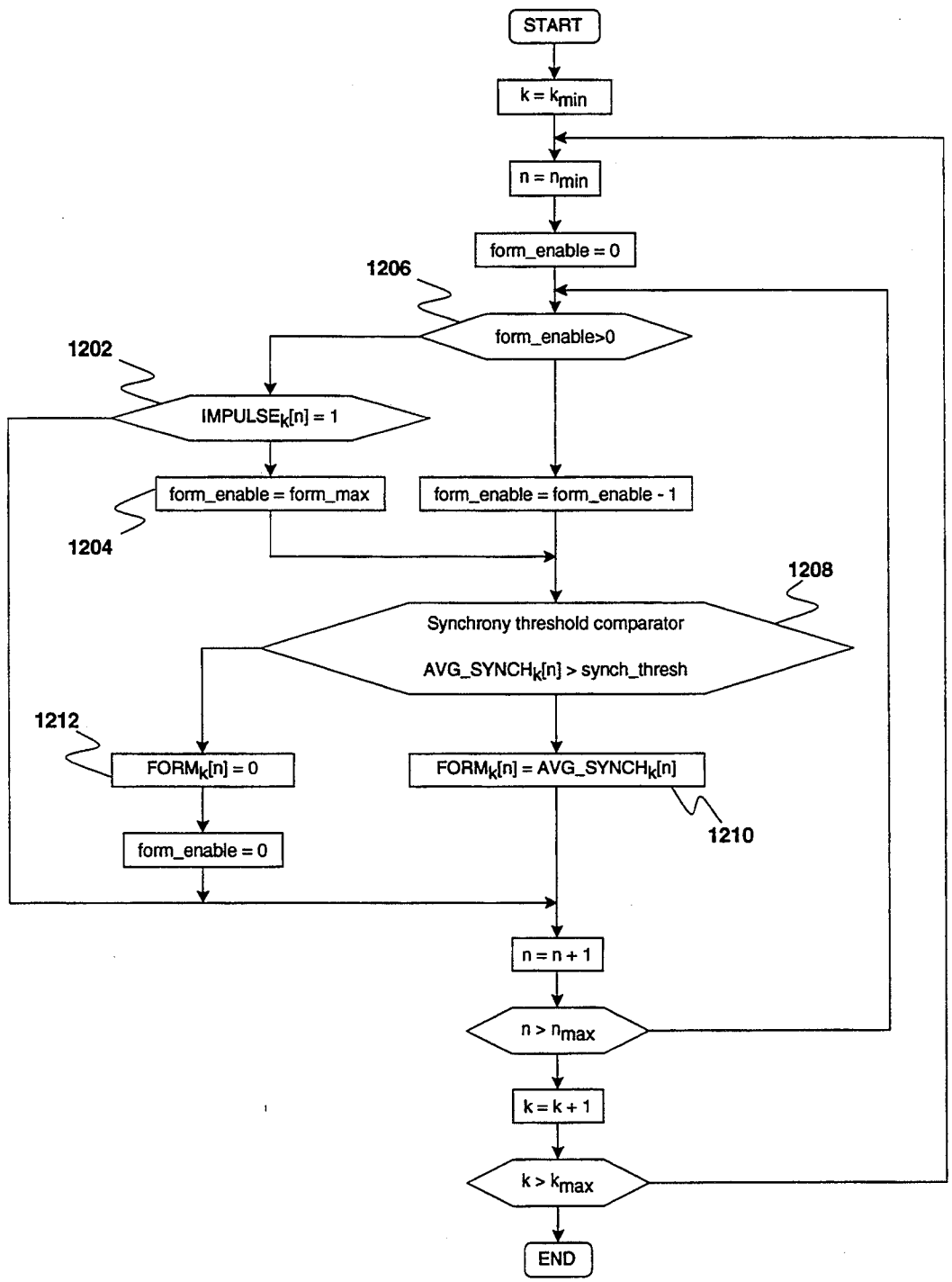
FIG. 12 is a flow chart illustrating a method for implementing the local formant detector.

FIG. 12 is a flow chart illustrating a method for implementing local formant detector 618. The formant detector receives input from both local impulse detector 608 (i.e. sequences $IMPULSE_k[n]$ 612) and local synchrony detector 610 (i.e. sequences $AVG\_SYNCH_k[n]$ 614). Each channel of local formant detector 618 produces an output when a synchronous response occurs on that channel within a given time window after a local impulse. In the preferred embodiment, formant detection is enabled by setting a formant time counter form_enable to a positive value, form_max 1204 when a local impulse occurs on channel k at time n (i.e. the sequence $IMPULSE_k[n]=1$ 1202). While form_enable is greater than zero 1206, formant detection is enabled and a synchrony threshold comparator 1208 detects whether the magnitude of the averaged synchronized response, $AVG\_SYNCH_k[n]$ 614, is greater than a threshold value, synch_thresh. If $AVG\_SYNCH_k[n] >$ synch_thresh, a formant is defined to occur on the channel k at time n and the value of the output sequence $FORM_k[n]$ is set to a value of $AVG\_SYNCH_k[n]$ 1210. Otherwise $FORM_k[n]$ is set to zero 1212 and form_enable is reset 1214.

The neurophysiological process of lateral inhibition is commonly used in cells throughout the nervous system to sharpen the spatial extent of responses.

Figure 13:
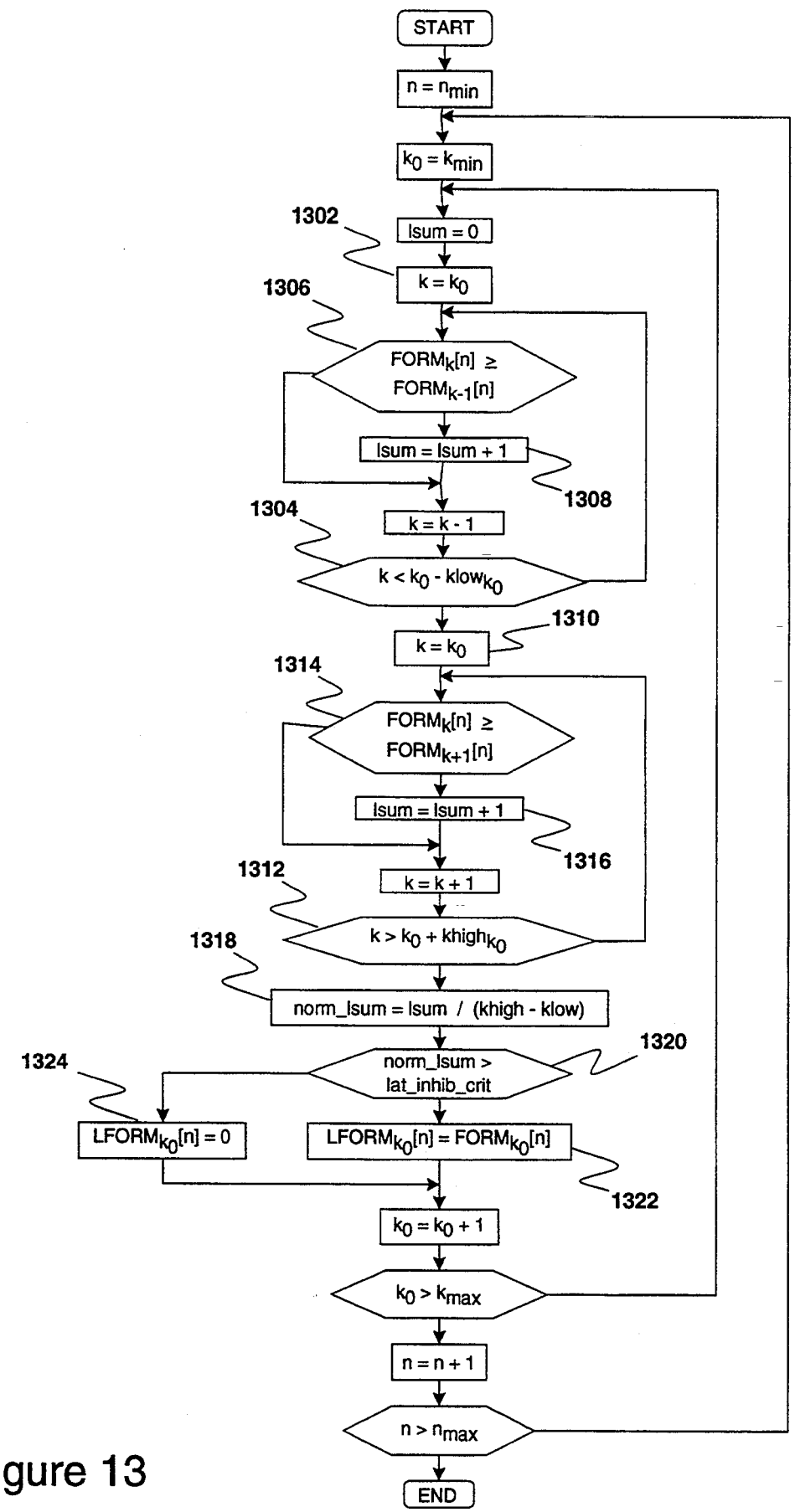
FIG. 13 is a flow chart illustrating the operation of the spatial response filtering stage used in connection with the formant detector illustrated in FIG. 12.

FIG. 13 is a flow chart illustrating the operation of spatial response filtering stage 622 that can be used in connection with the formant detector illustrated in FIG. 12 to sharpen the spatial extent of formant detection. The spatial response filtering stage 622 detects the condition that the amplitude of the formant sequence, $FORM_k[n]$ 620 is maximum at some channel $k=k_0$, and decreases for surrounding channels, both at higher values of k (i.e. values of $k_0 < k \leq k_0 + khigh_{k0}$) and lower values of k (i.e. $k_0 - klow_{k0} < k_0$). The spatial filtering bandwidth, defined as the range of channels over which effective spatial response filtering takes place for channel $k_0$, is between $k_0 + khigh_{k0}$ and $k_0 - klow_{k0}$, where the values of the constants khigh and klow depend on channel number, $k_0$. In the preferred embodiment, the values of $khigh_{k0}$ and $klow_{k0}$ are chosen as a function of k so that the spatial filtering bandwidth is approximately two critical bands centered around $k_0$. With reference to FIG. 13, for each time n, and for each channel $k=k_0$, spatial response filtering stage 622 determines whether, for a range of channels from $k=k_0$ 1302 to $k=k_0-klow_{k0}$ 1304 the amplitude of the formant at k is less than the formant at the next lower channel, i.e. whether $FORM_k[n] \geq FORM_{k-1}[n]$ 1306. If so, a counter, lsum 1308, is incremented by one. Similarly, for a range of channels from $k=k_0$ 1310 to $k=k_0+khigh_{k0}$ 1312, if the amplitude of the formant at k is less than the formant at the next higher channel, (i.e. if $FORM_k[n] \geq FORM_{k+1}[n]$ 1314. counter lsum is incremented by one 1316. At the completion of this process, a normalized count, norm_sum 1318, is computed by dividing lsum by spatial filtering bandwidth, norm_lsum=lsum/(khigh$_{k0}$−klow$_{k0}$). If the value of the normalized count exceeds a criterion value, (i.e. norm_lsum>lat_inhib_crit 1320), a spatially filtered formant is said to be detected at $k=k_0$ and n, and the value of an output sequence $LFORM_{k0}[n]$ is set to $FORM_{k0}[n]$ 1322. Otherwise, the value of $LFORM_{k0}[n]$ is set to zero 1324.

Figure 14:
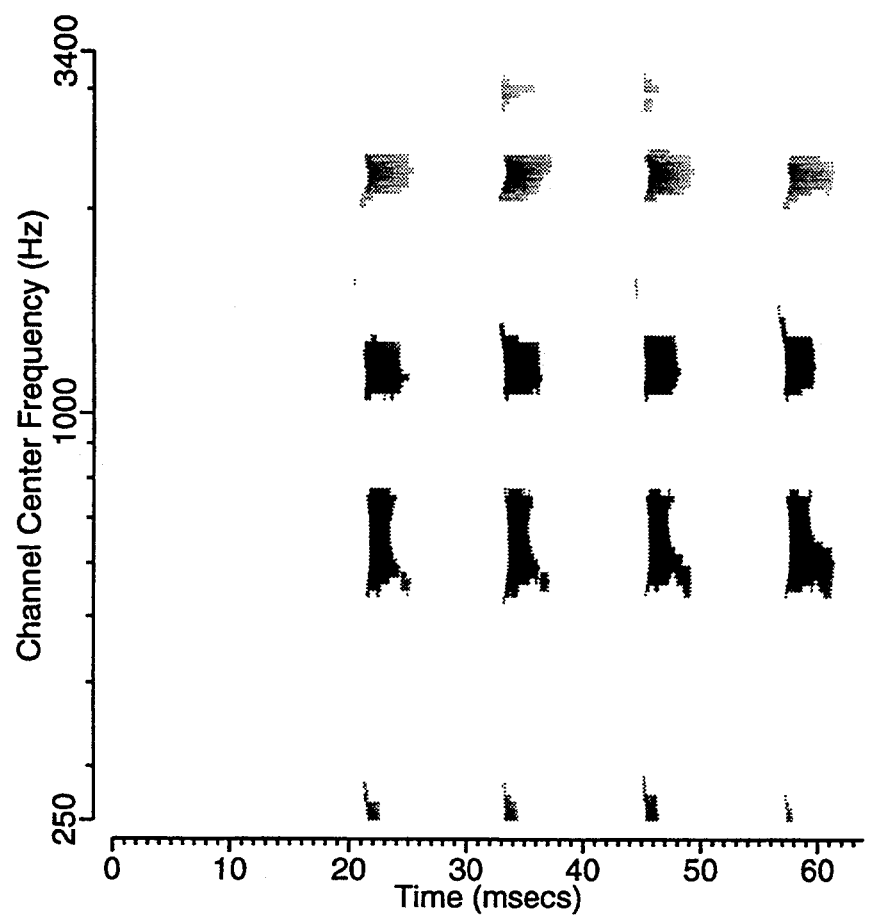
FIG. 14 is a plot of the response pattern to the utterance /a/ produced by the local formant detector in accordance with the implementation of FIGS. 12–13.

FIG. 14 is a plot of the response pattern, $LFORM_k[n]$ 624, to the utterance /a/ produced by the local formant detector 618 in accordance with the implementation of FIGS. 12-13. The spatial and temporal localization of information shown in this representation represents a dramatic improvement over prior-art techniques for formant detection, most of which are based on spectrographic representations. Unlike the spectrographic representations of voiced speech that characterize the prior art, the representation of formant information in FIG. 14 is highly localized simultaneously in both the frequency and time domains. Because the method of formant detection described in our invention is based on spatial gradients of phase of response, the method is highly insensitive to additive noise or spectral shaping of the input. The detection of formants by the methods of this invention uses the fact that voiced portions of speech are characterized by the alteration of impulsive and synchronous epochs of response, hence the representation of formant information produced by this method is highly selective for the formants of speech and resistant to non-speech signals.

Figure 15:
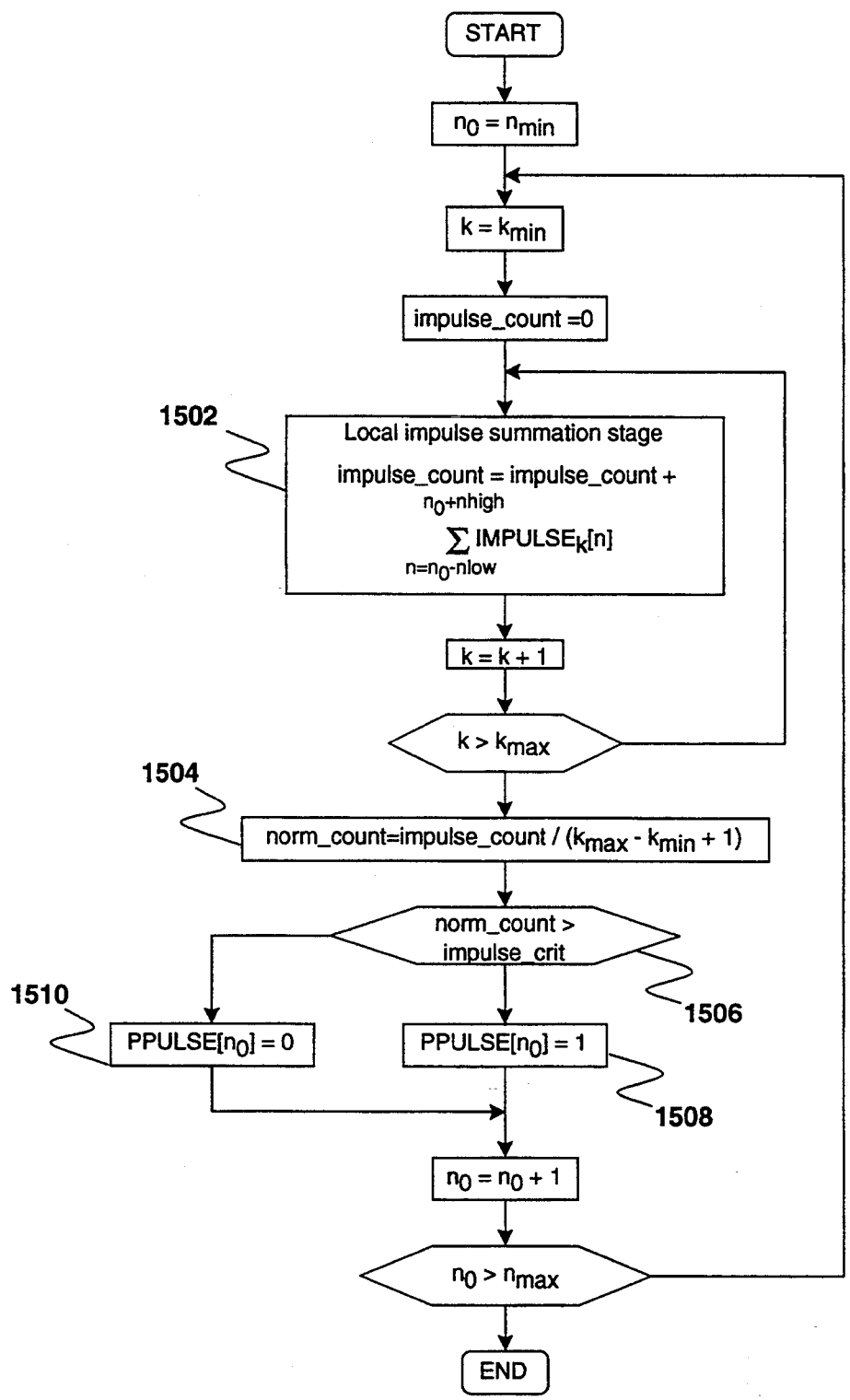
FIG. 15 is a flow chart illustrating the operation of the global pulse detector.

FIG. 15 is a flow chart illustrating the operation of the global pulse detector 626. This detector can be used to detect accurately the times of occurrence of glottal pulses in voiced utterances. The global pulse detector 626 produces an output when a given fraction of the outputs of local impulse detectors 608 have responded within a narrow time window. At each time, $n_0$, a local impulse summation stage 1502 adds the response of the local impulse detectors for all channels, $IMPULSE_k[n]$ 612 over a small time window around $n=n_0$ from $n_0-nlow \leq n \leq n_0+nhigh$ to form an impulse summation, impulse_count. The impulse summation is normalized by the total number of channels to form a normalized impulse count 1504:

$$norm\_count = impulse\_count/(k_{max}-k_{min}+1).$$

The normalized impulse count 1504 is compared to a criterion value, impulse_crit 1506. If norm_count>impulse_crit, then a global pulse is defined to have occurred and the value of sequence PPULSE[n] is set to one 1508. Otherwise, PPULSE[n] is set to zero 1510. The top trace of FIG. 9 904 shows the response of the global pulse detector to the utterance /a/.

The method of locating global pulses from the output of an aggregate of local impulse detectors represents a novel improvement over the prior art. A significant feature of global pulse detector 626 described in conjunction with FIG. 15 that distinguishes it from the prior-art glottal-pulse detectors is that the temporal location of each glottal pulse is individually determined from spatial patterns of correlation of response phase from local ensembles of channels occurring in small periods of time. Hence, the output of global pulse detector 626 is highly insensitive to the magnitude of the input sound as well as to additive noise and spectral shaping of the input. Furthermore, each glottal pulse is individually localized within a fraction of a millisecond based on temporally local patterns of phase correlation. This contrasts with pitch detectors disclosed in the prior art, which are generally based on the temporal correlations of speech signals over long periods of time, usually greater than one pitch period. Temporal correlation methods are best suited to signals which are periodic or near-periodic. However, in speech, pitch is rarely constant and therefore the location of glottal pulses by correlation methods can produce highly variable and aperiodic results, compromising the performance of temporal correlation methods. The performance of prior-art methods of pitch detection also degrade rapidly in noise.

In a ramification of global pulse detector 626 of the phase-coherence implementation which is not shown, the global pulses are determined from the output of the local formant detector, 618. In this ramification, the output of all the channels of the local formant detector, 618 is summed at every time n to form a sequence SUM_LFORM[n]:

$$SUM\_LFORM[n] = \sum_{k=k_{low}}^{k_{high}} LFORM_k[n].$$

Then, for each value of n, the value of SUM_LFORM[n] is compared to a threshold value, sum_lform_high. If the value of SUM_LFORM[n] exceeds the threshold value, then a global pulse is said to be detected and the value of sequence PPULSE[n] is set to one. Otherwise, PPULSE[n] is set to zero. The threshold comparator in this ramification has hysteresis. This means that after a global pulse is detected, the value of SUM_LFORM[n] must drop below a threshold value sum_lform_low before another pulse can be detected.

The priorly disclosed invention of Allen et al. (U.S. Pat. No. 4,905,285) has suggested a method of determining the spectral frequencies of formants by analyzing inverse interval histograms accumulated from the response of model cochlear-nerve fibers. This approach suffers from a number of deficiencies, including the problems of temporal granularity and computational intractability we have discussed in conjunction with the neural threshold-crossing implementation of FIG. 1. Temporal granularity results from the attempt to estimate the frequency of neural discharge from each model nerve fiber. Because frequency is estimated from the time interval between pairs of neural pulses, estimates of frequency can only be made at discrete times, corresponding to the threshold crossings of the neutral responses, and are therefore temporally granular. Furthermore, because the variance of the time between neural firings increases in model nerve fibers with lower characteristic frequency, the response of these low-frequency fibers is not only more temporally granular than that of high-frequency fibers, but the estimated frequency has a higher variance as well. The method of Allen et al. (U.S. Pat. No. 4,905,285) is computationally intractable as well. It requires the solution of a nonlinear cochlear model with a number of fibers (85 fibers in the preferred embodiment) to obtain the times of neural firing. Finally, the method of Allen et al. (U.S. Pat. No. 4,905,285) is not inherently speech specific: it does not distinguish speech from non-speech sounds.

In contrast to the prior art, the present invention provides an implementation, which we term the instantaneous-frequency implementation, for deriving information on speech features such as formant frequencies and glottal pulses from the frequency of response of channels of the cochlear signal processing stage 602 described in conjunction with FIG. 6 which improves upon the method of Allen et al. (U.S. Pat. No. 4,905,285). The instantaneous-frequency implementation is temporally fine-grain and computationally tractable and inherently specific for the detection of speech features. The basis of the implementation is the finding, demonstrated by analysis of the peripheral auditory filtering stage 108 described in Appendix A, that the temporal relationships between threshold-crossings in the output of the cochlear model of neural output are preserved in the instantaneous frequency of each channel of the underlying basilar membrane motion. Because the cochlear signal processing stage 602 of the model of the peripheral auditory system is linear, the computational efficiency of the frequency calculations is improved. In this implementation, input sound p(t) 102 is transformed by signal converter 104 into discrete-time input sound, sequence, p[n] 106. Input sequence 106 is processed by cochlear signal processing stage 602 to produce sequences of instantaneous magnitude, $A_k[n]$ 716 and phase, $\Phi_k[n]$ 718, as described in connection with FIG. 7 and Appendix A. The instantaneous frequency, $f_k[n]$, of channel k is represented by the change in instantaneous phase as a function of time:

$$f_k[n] = \frac{1}{2\pi} \frac{d\phi_k(t)}{dt} = \frac{1}{2\pi} \frac{d\phi_k[n]}{dn} \frac{dn}{dt}.$$

where dn/dt is the sampling rate of the sequences. Because the phase, $\Phi_k[n]$, of each channel of the peripheral model can be accurately estimated with high temporal resolution, it is possible to obtain an estimate of the time derivative, $d\Phi_k[n]/dt$, with high temporal resolution. In the embodiment depicted in FIG. 17, for computational simplicity we compute the discrete-time derivative, $d\Phi_k[n]/dn$, from the forward or backward difference of two time points (i.e. $d\Phi_k[n]/dn = \Phi_k[n] - \Phi_k[n-1]$); however, other means of computing the time derivative are not excluded.

Figure 16:
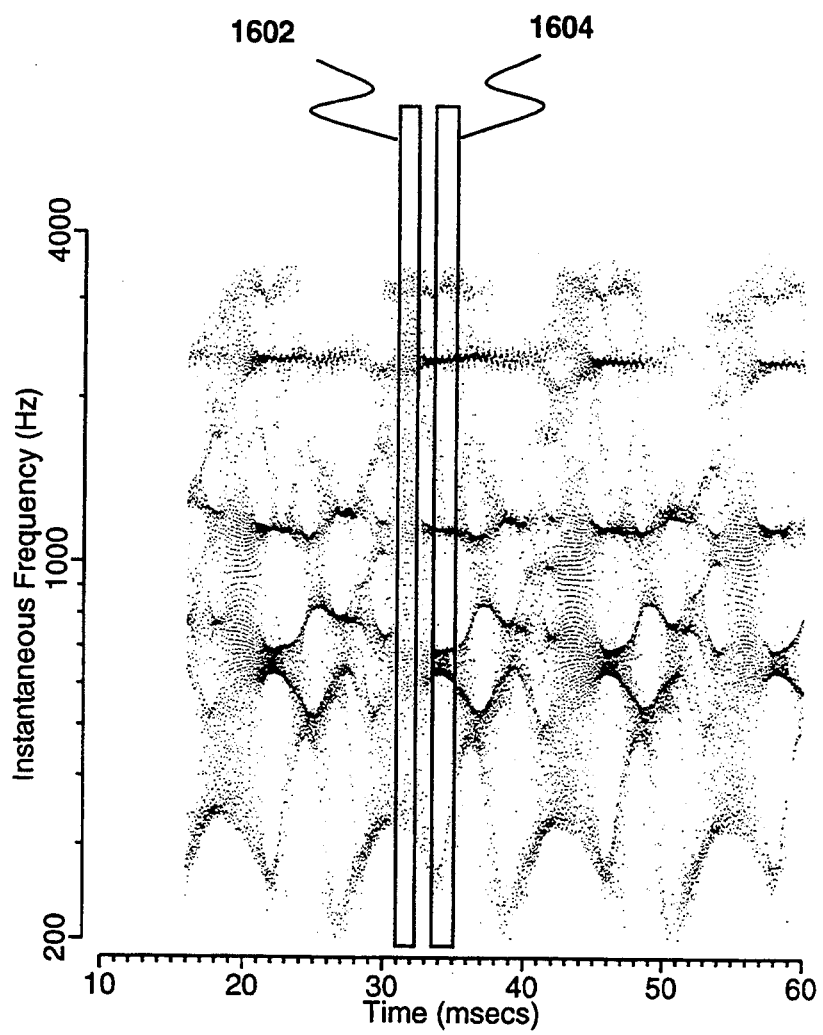
FIG. 16 is a plot of the instantaneous frequency of the cochlear signal-processing stage to the utterance /a/.

FIG. 16 is a plot of the response pattern of $f_k[n]$ produced by the instantaneous-frequency implementation to a voiced utterance, /a/. The response consists of two distinct spatio-temporal patterns, an impulsive epoch 1602 and a synchronous epoch 1604 occurring in alternation. These epochs are equivalent to the impulsive 202 and synchronous 204 epochs previously described in connection with FIG. 2A. In the impulsive epoch 1602, elicited by each glottal pulse of the utterance, the instantaneous frequency response shows a characteristic 'ladder-like' pattern, where each 'rung' of the ladder represents the instantaneous frequency of one channel responding at or near that channel's center frequency, $CF_k$, for a brief period of time (approximately two milliseconds). In the synchronous epoch 1604, the responses of most of the model channels become entrained into a plurality of distinct bands of frequency corresponding to the resonances of the vocal tract, the formants, for a brief period of time (2-5 milliseconds). In this epoch, the instantaneous frequencies of the responses of groups of channels are approximately the same, and correspond to the frequency of the proximal formant. The local impulse detector and local synchrony detector of the instantaneous-frequency implementation are similar to those described for the phase-coherence implementation in conjunction with FIGS. 8 and 10, but are implemented using information from histograms of instantaneous frequency (which is proportional to $d\Phi_k[n]/dn$) computed for a plurality of channels rather than from information on the spatial derivatives of response phase (which is proportional to $d\Phi_k[n]/dk$).

Figure 17:
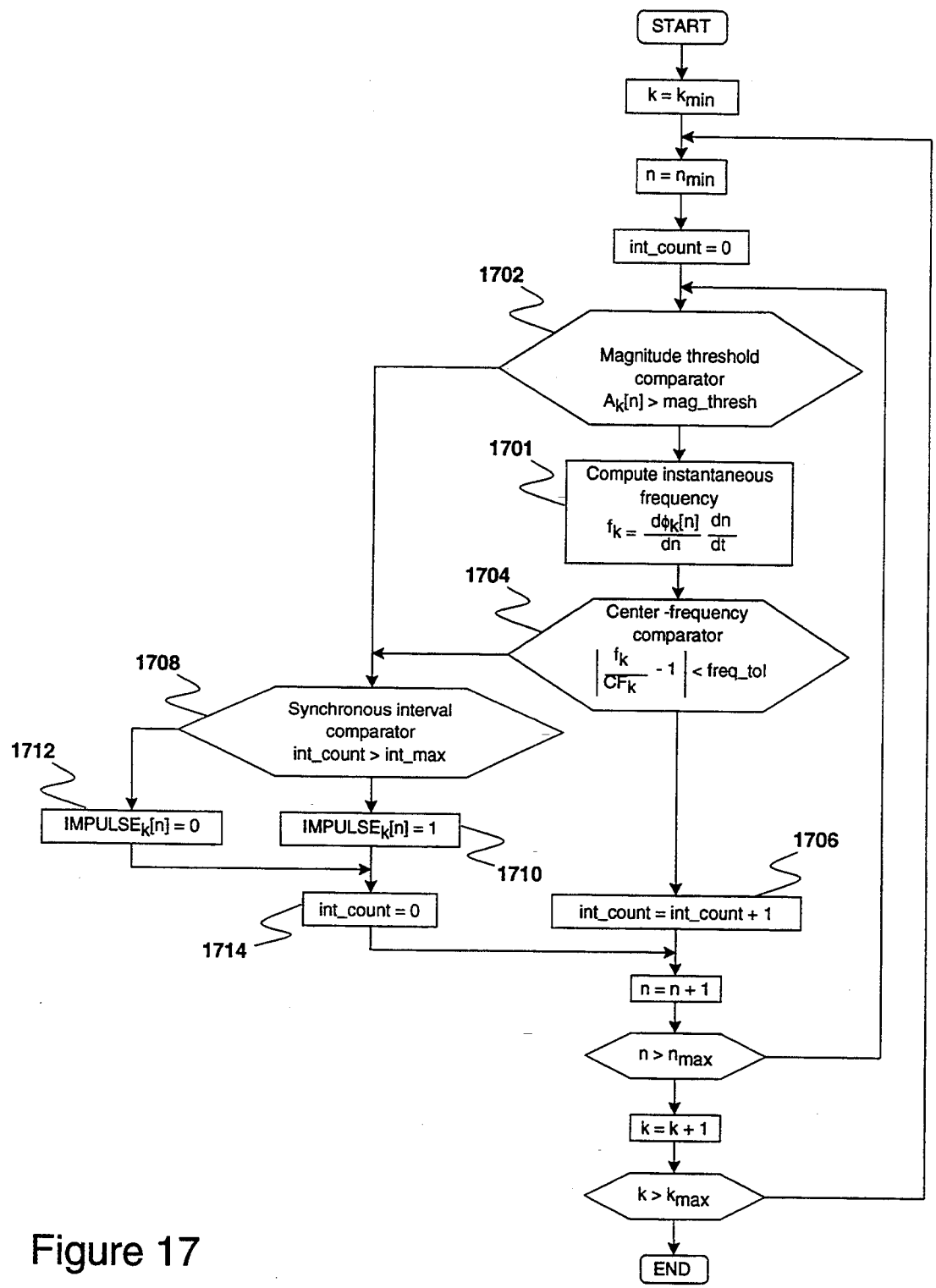
FIG. 17 is a flow chart illustrating a method for implementing the local impulse detector of the instantaneous-frequency implementation.

FIG. 17 is a flow chart illustrating a method for implementing the local impulse detector of the instantaneous-frequency implementation. The purpose of the local impulse detector is to detect the 'ladder-like' pattern 1602 produced in the impulsive interval of the instantaneous frequency response. With reference to FIG. 17, the instantaneous frequency, $f_k[n]$ 1701, is computed for every channel, k, and every time n for which the magnitude of the input sequence exceeds a threshold value, $A_k[n] > \text{mag\_thresh}$ 1702. A center-frequency comparator 1704 is used to determine whether the instantaneous frequency of channel k is equivalent to that channel's center frequency, denoted $CF_k$. In the embodiment depicted in FIG. 17, the center-frequency comparator 1704 determines whether the average deviation of $f_k[n]$ from $CF_k$ is less than a constant value, freq\_tol:

$$|f_k[n]/CF_k - 1| < \text{freq\_tol}$$

If so, a counter, int\_count 1706, is incremented. This counter measures the length of the impulsive interval for channel k, the period during which the instantaneous frequency of channel k is within a given tolerance of the channel's center frequency. If the instantaneous frequency of channel k differs by more than the tolerance value from the channel's center frequency, the impulsive interval ends, and an interval comparator 1708 determines whether the length of the impulsive interval exceeds a fixed value, int\_max. If so, an impulse is said to be detected on channel k and the value of an output impulse sequence, $\text{IMPULSE}_k[n]$ is set to one 1710, otherwise $\text{IMPULSE}_k[n]$ is set to zero 1712. Then int\_count is reset to zero 1714, and the process is repeated for all times and channels.

Figure 18:
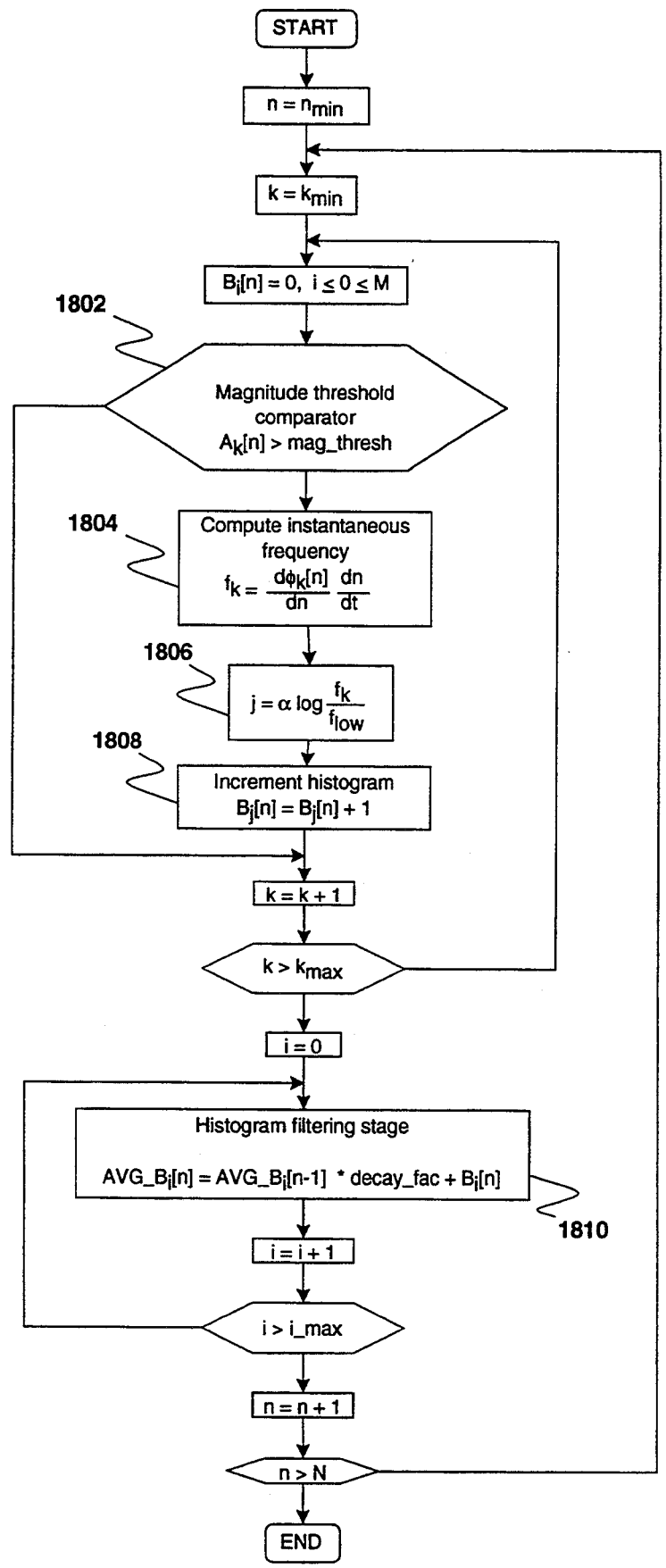
FIG. 18 is a flow chart illustrating a method for implementing the local synchrony detector of the instantaneous-frequency implementation.

FIG. 18 is a flow chart illustrating a method for implementing the local synchrony detector of the instantaneous-frequency implementation. In this implementation, a frequency histogram of M+1 bins is formed with bins $B_i, 0 \leq i \leq M$. In the embodiment depicted in FIG. 18, the bins of the frequency histogram span a frequency range from $f_{min}$ to $f_{max}$ in equal logarithmic increments, where $f_{min}$ and $f_{max}$ represent, respectively, the center frequencies corresponding to the low and high channels of cochlear signal processing stage 602, $k_{min}$ and $k_{max}$. For each channel, k, and time, n, a magnitude threshold comparator 1802 determines whether the magnitude of the response, $A_k[n]$ 716 exceeds a magnitude threshold, $A_k[n] > \text{mag\_thresh}$. If so, the instantaneous frequency, $f_k[n]$, is computed 1804, and the bin of frequency histogram, j, corresponding to this frequency is determined 1806 as $$j = \text{int}(\alpha \log f/f_{min}),$$

where int( ) denotes the integer part operator and $\alpha = M/\log (f_{max}/f_{min})$ is a constant. Bin j of the frequency histogram is then incremented by one 1808. This procedure is repeated for all channels, k, to construct the frequency histogram $B_i[n]$ at a given time, n. Peaks in this frequency histogram indicate values of frequency at which a plurality of channels respond in synchrony. The frequency histogram, $B_i[n]$ gives a similar representation to $\text{SYNCH}_k[n]$ 1006.

A histogram filtering stage 1810 filters histogram $B_i[n]$ to produce a filtered frequency histogram, $\text{AVG\_}B_i[n]$. In the embodiment depicted in FIG. 18, an exponentially averaging filter is used:

$$\text{AVG\_}B_i[n] = \text{AVG\_}B_i[n-1] * \text{decay\_fac} + B_i[n],$$

where the exponential averager time constant, decay\_fac, is less than one. The filtered frequency histogram, $\text{AVG\_}B_i[n]$ gives a similar representation to $\text{AVG\_SYNCH}_k[n]$ 614. A secondary feature detection stage of the instantaneous-frequency implementation, which detects formants, glottal pulses and vowels is identical to the secondary feature detection stage of the phase-correlation implementation 616 described in conjunction with FIGS. 6, 12, 13 and 15.

In summary, we have described several methods for analyzing speech to detect and categorize linguistically important features, such as the frequencies and times of formants and glottal pulses. Representations of the formants and glottal pulses are obtained from local and global temporal and spatial correlations of the response computed from a plurality of channels of a cochlear signal processing stage. The features detected by this method are highly unaffected by additive noise and insensitive to spectral shaping or bandwidth reduction of the input. They are selective for the detection of speech features such as glottal and formant information. They do not require critical data segmentation. They simultaneously show high temporal and frequency resolution. Results can be obtained in a computationally efficient manner.

The scope of the invention should be determined by the appended claims and their legal equivalents, rather than by the examples given.

Figure 19:
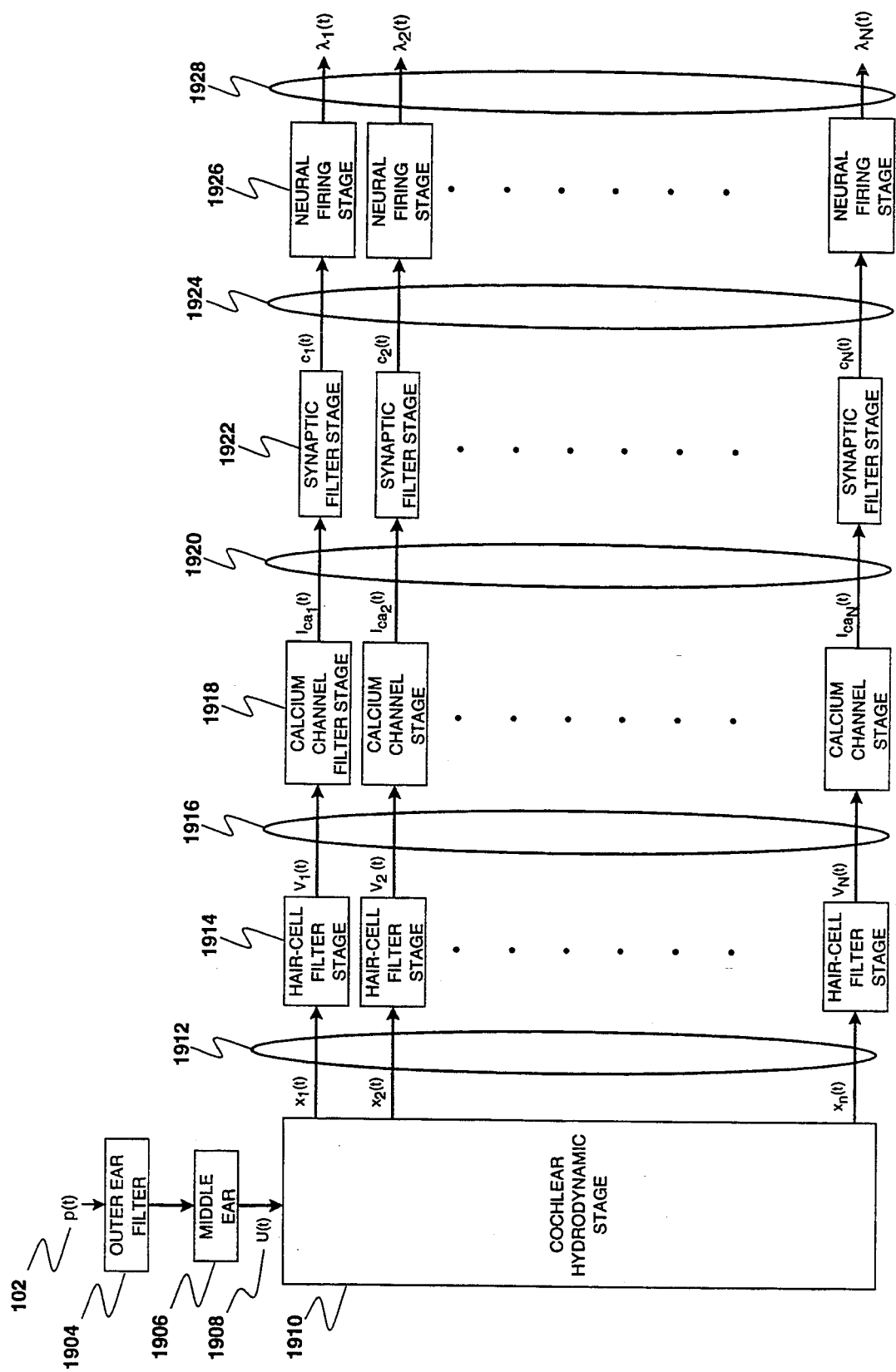
FIG. 19 is a block diagram of the peripheral auditory filtering stage based on a model of signal processing by the peripheral auditory system which motivates the principal implementations of the invention.

Appendix A—Description of an implementation of a model of the peripheral auditory system FIG. 19 shows a block diagram of the peripheral auditory filtering stage 108 based on a model of signal processing by the peripheral auditory system which motivates the principal implementations of the invention. An incident sound p(t) 102 is processed by linear filters which emulate the filtering characteristics of the outer 1904 and middle 1906 ears to produce an output U(t) 1908 which describes the volume velocity of the stapes. The volume velocity of the stapes is input into a cochlear hydrodynamic filtering stage 1910, a filter bank which comprises a plurality of sharply frequency-selective bandpass filters whose frequency responses are derived from an analysis of a three-dimensional hydromechanical model of the fluid wave processes of the cochlea which comprises part of the peripheral auditory filtering stage 108. In the preferred embodiment, the cochlear hydrodynamic filtering stage 1910 has 120 channels corresponding to the response at positions linearly spaced along the basilar membrane. Each channel, k, has a different frequency of maximum response, the center frequency, $CF_k$. The center frequency as well as other characteristics of each filter channel vary as a function of k, which represents the spatial dimension of the response. The linear spacing of channels of the model of the basilar membrane results in values of $CF_k$ which are approximately logarithmically spaced in frequency over the range $CF_0$ 250 Hz (for k=0) to $CF_{119}$=3.4 kHz (for k=119).

Figure 20:
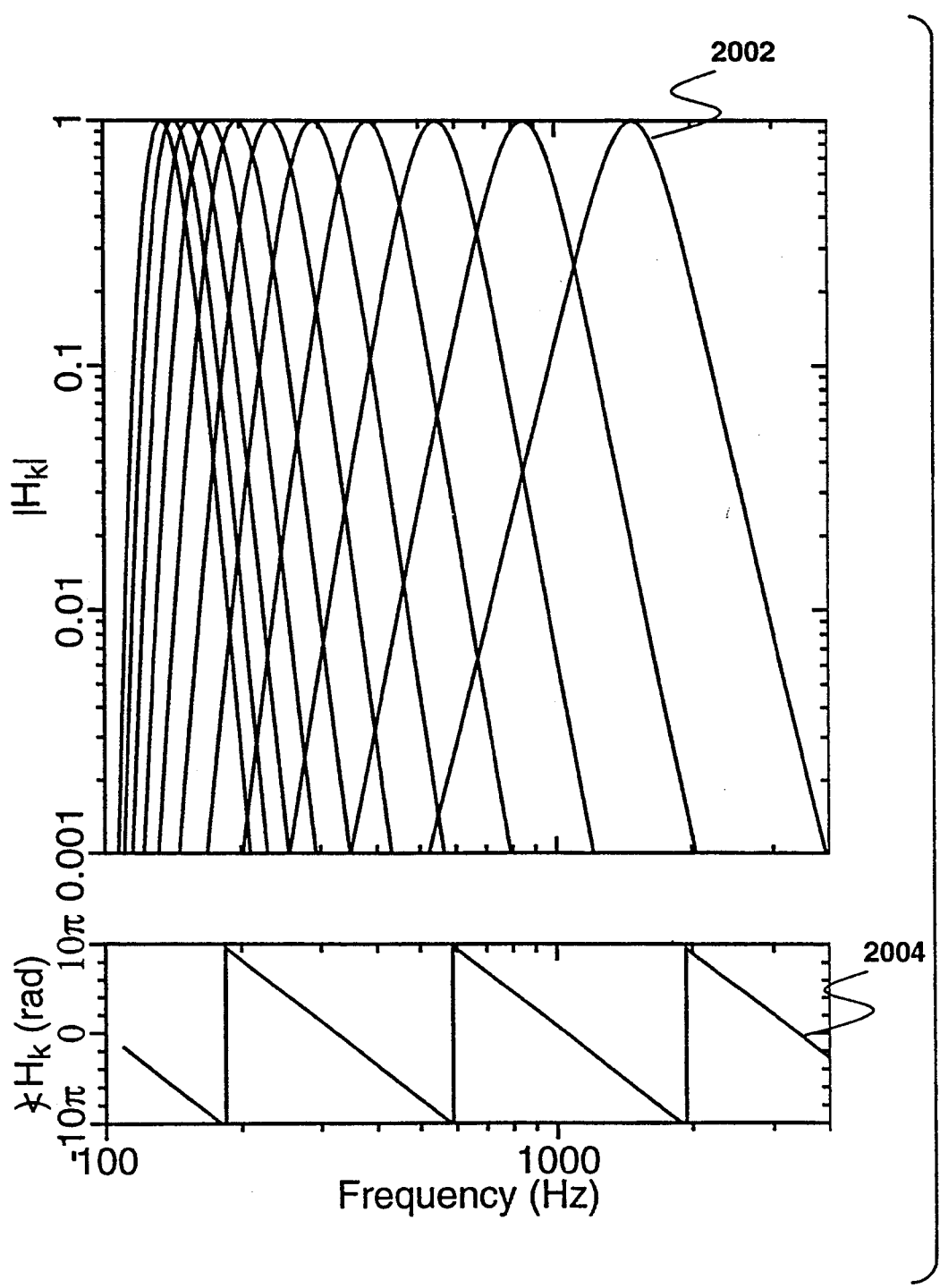
FIG. 20 is a plot of twelve representative cochlear frequency- and phase-response functions, useful in the implementation of the cochlear signal-processing stage, described in Appendix A.

FIG. 20 is a plot of representative cochlear frequency-response functions, $H_k[l]$ 2002, for 12 channels selected to cover the range 250 Hz to 3.4 kHz. While we have chosen to derive these filter functions from consideration of models and data of the auditory system, we do not exclude other filter response functions for $H_k[l]$ derived by other means. For each channel of the cochlear hydrodynamic filtering stage 1910, the output is a waveform x(t) 1912 that represents the motion of the basilar membrane of the cochlea at a location characteristic of the frequency, $CF_k$. In the preferred embodiment, x(t) is determined at a temporal resolution of approximately 15 μsec by the process described in connection with FIG. 7.

Each channel of cochlear hydrodynamic filtering stage 1910 is followed by an instantaneous, non-linear hair-cell filtering stage 1914 which represents the mechanical-to-electrical transduction process in the hair cells in the organ of Corti. This hair-cell filtering stage can be described by a lumped-element circuit model shown in FIG. 21A. The hair cell's nonlinear transduction conductance, $G_T$, is a function of the displacement of the hair-cell cilia x(t):

$$G_T(x(t)) = \frac{G_T^{MAX}}{1 + e^{(G-Zx(t))/RT}} \quad (1)$$

Figure 21A:
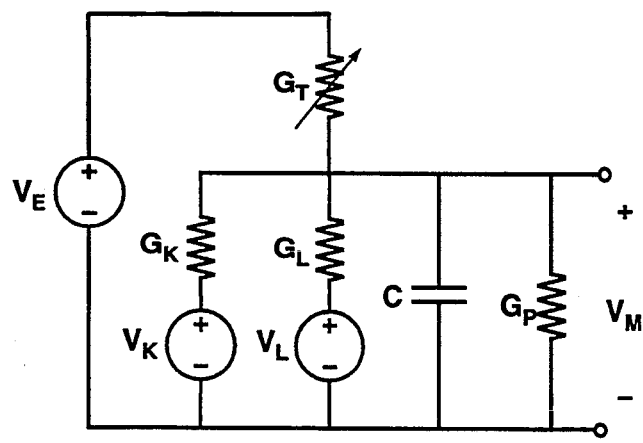
FIG. 21A is a schematic equivalent circuit of the hair-cell filtering stage.

The cell's membrane potential, $V_M(t)$ can be obtained by solving the circuit of FIG. 21A:

$$C\frac{dV_M(t)}{dt} + V_M(t)G_\Sigma(t)V_M(t) = V_\Sigma(t)G_\Sigma, \quad (2)$$

where $$G_\Sigma(t) = G_T(x(t)) + G_P + G_L + G_K \quad (3)$$

and $$V_\Sigma(t) = (V_E G_T(x(t)) + V_K G_K + V_L G_L)/G_\Sigma(t). \quad (4)$$

where $$G_\Sigma(t) = G_T(x(t)) + G_P + G_L + G_K \quad (3)$$

and $$V_\Sigma(t) = (V_E G_T(x(t)) + V_K G_K + V_L G_L)/G_\Sigma(t). \quad (4)$$

The circuit parameters are given as:

| Parameter | Description | Value |
| --- | --- | --- |
| $V_E$ | Endolymphatic potential | 100 mV |
| $V_K$ | Potassium equilibrium potential | −80 mV |
| $V_L$ | Nonspecific leakage potential | −30 mV |
| $G_L$ | Nonspecific leakage conductance | 1 nS |
| $G_K$ | Potassium conductance | 26.1 nS |
| G | x-independent free-energy of transduction | 1.26 |
| Z | x-dependent free-energy of transduction | 7.1 |
| $G_T^{MAX}$ | Maximum transduction conductance | 7.5 nS |
| $G_P$ | Electrode leakage conductance | 28.7 nS |
| C | Hair cell capacitance | 15 pF |

The output of hair-cell filtering stage 1914 is a hair-cell membrane potential, $V_M(t)$ 1916 which is input into a calcium-channel filtering stage 1918 derived from a biophysically based model of the hair cell's calcium channel (Lewis, R. S. (1985): The ionic basis of frequency selectivity in hair cells of the bullfrog's sacculus. Ph.D. Thesis, California Institute of Technology). The calcium-channel filtering stage 1918 relates the calcium current in a hair cell, $I_{Ca}(t)$ 1920, to the cell's membrane potential:

$$I_{Ca}(t) = G_{Ca} m^3(t)(V_M(t) - V_{Ca}), \quad (5)$$

where the kinetics of the calcium channel are represented by the activation parameter, m, which is controlled by first-order kinetics, $$\frac{dm}{dt} = \beta_M(1 - m(t)) - \alpha_M m(t), \quad (6)$$

and the kinetic rate constants, $\alpha_M$ and $\beta_M$ are functions of the membrane potential:

$$\alpha_M(V_M) = \alpha_0 e^{-(V_M + V_0)/V_A} + k_A,$$

$$\beta_M(V_M) = \beta_0 e^{+(V_M + V_0)/V_B} + k_B. \quad (7)$$

The parameters of calcium channel filtering stage 1918 at 37° C. are given as follows:

| Parameter | Description | Value |
| --- | --- | --- |
| $G_{Ca}$ | Calcium channel conductance | 6.14 nS |
| $V_{Ca}$ | Calcium equilibrium potential | 100 mV |
| $\alpha_0$ | | 118472 sec$^{-1}$ |
| $\beta_0$ | | 5.04 sec$^{-1}$ |
| $k_A$ | Closing kinetic constant | 2650 sec$^{-1}$ |
| $k_B$ | Opening kinetic constant | 4884 sec$^{-1}$ |
| $V_A$ | Closing voltage sensitivity | 8.01 mV |
| $V_B$ | Opening voltage sensitivity 6.17 | 6.17 mV |
| $V_O$ | Voltage offset | 70 mV |

Figure 21B:
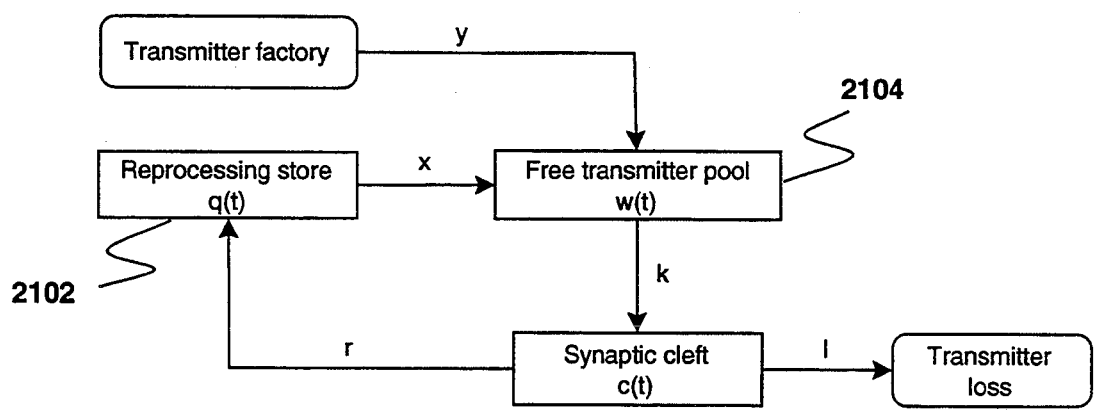
FIG. 21B is a block diagram of the synaptic filtering stage.

The hair-cell 1914 and calcium-channel 1918 filtering stages are followed by a synaptic filtering stage 1922. This is a time-varying non-linear filtering stage that represents the neuro-chemistry of the synapse between the hair-cell and the afferent fibers of the cochlear nerve. FIG. 21B shows a block diagram of the synaptic filtering stage 1922. This filtering stage describes the relation between the calcium current, $I_{Ca}(t)$ 1920 and the (normalized) concentration of neuro-transmitter in the synaptic cleft, c(t) 1924. Synaptic filtering stage 1922 is described by three coupled differential equations with non-constant coefficients, as given by Meddis (Meddis, R. (1986): Simulation of mechanical to neural transduction in the auditory receptor. J. Acoust. Soc. Am. 79: 702–711; Meddis, R. (1988): Simulation of auditory-neural transduction: further studies. *J. Acoust. Soc. Am.* 83: 1056-1063).

$$\frac{dq}{dt} = y(1 - q(t)) + xw(t) - k(t)q(t), \quad (8)$$

$$\frac{dc}{dt} = k(t)q(t) - lc(t) - rc(t),$$

$$\frac{dw}{dt} = rc(t) - xw(t),$$

where q(t) and w(t) represent the normalized concentrations of neuro-transmitter in a reprocessing store 2102 and a free transmitter pool 2104 respectively, and x, y, l and r are rate constants describing the turnover of transmitter among the stores of the model. The presynaptic permeability, k(t) is taken to be proportional to the hair cell's calcium current, $I_{Ca}(t)$ 1920 in the speech frequency range:

$$k(t) = k_0 + \xi k_\Delta^{MAX} I_{Ca}(t). \quad (9)$$

The parameters of the synaptic filtering stage 1922 are:

| Parameter | Description | Value |
|---|---|---|
| x | Reprocessing store turn-over rate | 85.9 |
| y | Neurotransmitter production rate | 15.1 |
| l | Synapse loss rate | 1994.7 |
| r | Synapse reabsorbsion rate | 8007.6 |
| $k_O$ | Resting presynaptic permeability | 16.1 |
| $k_\Delta^{MAX}$ | Maximum permeability increase | 297.3 |
| $\xi$ | Calcium coupling factor | −1.67 |

A neural firing stage 1926 relates the concentration of neurotransmitter in the cleft 1924 to the probability density function of discharge of action potentials in the primary cochlearnerve fibers that carry information to the brain, λ(t) 1928. In one implementation of this model, λ(t) is taken to be directly proportional to c(t).

The peripheral auditory filtering stage 108 is realized by implementing the computations of Equations 1-9 using a processor arrangement incorporating, for example, a type MC68040 microprocessor or type DSP56001 digital signal processor. In this implementation, the incident sound p(t) 102 is transformed by a signal converter 104 into a discrete-time sound sequence, p[n] 104. Then, discrete-time sequences with index n analogous to sampled versions of functions of a continuous variable, t, are computed within the processor as follows:

The equivalent discrete-time output of the implementation of the cochlear hydrodynamic filtering stage, 1910 is an array of sequences $x_k[n]$, whose computation is implemented either by means of the Fourier transformation techniques similar to those described in conjunction with FIG. 7, or by direct convolution of p[n] with $h_k[n]$, the impulse response obtained by inverse Fourier transformation of the cochlear frequency-response functions, $H_k[l]$ 2002 by methods well known to the art. In the preferred embodiment of peripheral auditory filtering stage 108, there are 120 channels of $H_k[l], 0 \leq k \leq 119$, which span the frequency range of approximately 250 Hz to 3.4 kHz.

Discrete-time sequences for $G_T[n]$ (Equation 1), $G_\Sigma[n]$ (Equation 3), $V_\Sigma[n]$ (Equation 4), are directly computed by substituting x[n] into the equations in place of x(t). The membrane potential sequence, $V_M[n]$, is obtained by solving Equation 2 with a standard numerical integration method, such as the Runge-Kutta technique (Press, W. H., Flannery, B. P., Teukolsky, S. A. and Vetterling, W. T. (1988): *Numerical Recipes in C.*, Chapter 15. Cambridge: Cambridge University Press). The discrete-time sequence for the calcium current, $I_{Ca}[n]$ (Equation 5) is computed from the membrane potential sequence, $V_M[n]$, and the activation parameter, m[n], where m[n] is obtained by solving Equation 6 with a standard numerical integration method. Sequences for the kinetic rate constants, $\alpha_M$ and $\beta_M$ are obtained from Equations 8 by substitution of $V_M[n]$. The presynaptic permeability sequence k[n] is obtained from Equation 9 by substitution of $I_{Ca}[n]$. The discrete-time sequence for concentration of neuro-transmitter in the synaptic cleft, c[n] is obtained from Equation 8 by solution of the coupled equations by standard numerical methods. The sequence representing the probability density function, λ[n] is obtained from Equation 9 by substitution of the sequence c[n]. The array of sequences $\lambda_k[n]$ 110 is created by solving the response of the model equations for all channels, $0 \leq k \leq 119$.

FIG. 2 shows the response of the model of the peripheral auditory system to the utterance /a/. This response pattern accurately simulates the response recorded from auditory-nerve fibers in mammalian ears to speech utterances (Shamma, S. (1985): Speech processing in the auditory nervous system, I: The representation of speech sounds in the responses of the auditory nerve. *J. Acoust. Soc. Am.* 78, 1612-1621).

We claim:

1. A method for analyzing a stimulus waveform comprising:
   a) providing a signal processing means which simulates the response properties of the human cochlea by supplying a plurality of output waveforms each of which corresponds to the response of said simulated cochlea at a selected location along its length;
   b) applying said stimulus waveform to the input of said simulated cochlea;
   c) processing said stimulus waveform by said signal processing means to produce a plurality of output waveforms at selected locations along the length of said simulated cochlea;
   d) detecting primary features of said stimulus waveform by comparing the spatial and time relationships of said output waveforms including their spatial and time derivatives with stereotypical output waveforms and their spatial and time derivatives;
   e) producing a plurality of sequences of said primary features at selected locations along said simulated cochlea;
   f) detecting secondary features of said stimulus waveform by comparing said sequences of primary features with stereotypical patterns of said primary features;
   g) producing a plurality of sequences of said secondary features; and
   h) producing an output representation comprising one or more sequences each of which results from detecting combined spatial and temporal relationships of said primary and secondary feature sequences.

2. The method for analyzing the stimulus waveform of claim 1 wherein said stimulus waveform is an acoustic stimulus such as sound or speech.

3. The method for analyzing the stimulus waveform of claim 1 wherein said simulated cochlea comprises a plurality of band-pass filter channels, each of said filters substantially matching the frequency response characteristic at a selected location along said simulated cochlea, with the timing and phase characteristics of the output of the ensemble of said filters substantially matching waveform propagation characteristics of the human cochlea.

4. The method for analyzing the stimulus waveform of claim 3 wherein said selected locations are equally spaced along the length of said simulated cochlea, approximately corresponding to logarithmic spacing of the center frequencies of said band-pass filter channels.

5. The method for analyzing the stimulus waveform of claim 1 wherein the step of detecting primary features comprises the comparison of said output waveforms and their spatial and time derivatives with stereotypical output waveforms and their spatial and time derivatives resulting from an impulsive stimulus waveform.

6. The method of claim 5 wherein the step of detecting primary features resulting from an impulsive stimulus waveform comprises:
   a) producing from said simulated cochlea a plurality of output sequences comprising an instantaneous magnitude sequence, $A_k[n]$, and an instantaneous phase sequence, $\Phi_k[n]$, where channel index k corresponds to location along said simulated cochlea and n corresponds to discrete-time index;
   b) computing a spatial phase derivative sequence, $d\Phi_k[n]/dx$, from the difference of said $\Phi_k[n]$ sequences of two adjacent channels;
   c) computing a spatio-temporal phase derivative sequence, $d^2\Phi_k[n]/dx\,dt$, from the difference of $d\Phi_k[n]/dx$ sequences for two sequential values of n;
   d) determining for each selected channel index $k_o$ and selected time index $n_o$ whether all of the following conditions are met for a predetermined interval of time near $n_o$, representing stereotypical response patterns for an impulsive stimulus waveform:
      i) whether said instantaneous magnitude exceeds a predetermined magnitude threshold;
      ii) whether said spatial phase derivative is negative for $n < n_o$ and becomes positive for $n > n_o$;
      iii) whether said spatio-temporal phase derivative is generally greater than zero;
   e) producing a plurality of primary feature sequences, $IMPULSE_k[n]$, which is set to one when said conditions are met and zero when they are not met.

7. The method of claim 5 wherein the step of detecting primary features resulting from and impulsive stimulus waveform comprises:
   a) producing from said simulated cochlea a plurality of output sequences comprising an instantaneous magnitude sequence, $A_k[n]$, and an instantaneous frequency sequence, $f_k[n]$, where channel index k corresponds to location along said simulated cochlea and n corresponds to discrete-time index;
   b) determining for each selected channel index $k_o$ and selected time index $n_o$ whether all of the following conditions are met, representing stereotypical response patterns for an impulsive stimulus waveform:
      i) whether said instantaneous magnitude exceeds a predetermined magnitude threshold;
      ii) whether said instantaneous frequency is approximately equal to the center frequency of said selected channel for a predetermined interval of time;
   c) producing a plurality of primary feature sequences, $IMPULSE_k[n]$, which is set to one when said conditions are met and zero when they are not met.

8. The method for analyzing the stimulus waveform of claim 1 wherein the step of detecting primary features comprises the comparison of said output waveforms and their spatial and time derivatives with stereotypical output waveforms and their spatial and time derivatives resulting from a sinusoidal stimulus waveform.

9. The method of claim 8 wherein the step of detecting primary features resulting from a sinusoidal stimulus waveform comprises:
   a) producing from said simulated cochlea a plurality of output sequences comprising an instantaneous magnitude sequence, $A_k[n]$, and an instantaneous phase sequence, $\Phi_k[n]$, where a channel index k corresponds to location along said simulated cochlea and n corresponds to discrete time index;
   b) computing a spatial phase derivative sequence, $d\Phi_k[n]/dx$, from the difference of said $\Phi_k[n]$ sequences of two adjacent channels;
   c) determining for each selected channel index $k_o$ and selected time index $n_o$ whether all of the following conditions are met for a predetermined interval of time near $n_o$, representing stereotypical response patterns for a sinusoidal stimulus waveform:
      i) whether said instantaneous magnitude exceeds a predetermined magnitude threshold;
      ii) whether said spatial phase derivative is approximately constant;
   d) producing a plurality of primary feature sequences, $SYNCH_k[n]$, which are set to $A_k[n]$ when said conditions are met and zero when they are not met.

10. The method of claim 8 wherein the step of detecting primary features resulting from a sinusoidal stimulus waveform comprises:
    a) producing from said simulated cochlea a plurality of output sequences comprising an instantaneous magnitude sequence, $A_k[n]$, and an instantaneous frequency sequence, $f_k[n]$, where channel index k corresponds to location along said simulated cochlea and n corresponds to discrete-time index;
    b) determining for each selected channel index $k_o$ and selected time index $n_o$ whether all of the following conditions are met, representing stereotypical response patterns for a sinusoidal stimulus waveform:
       i) whether said instantaneous magnitude exceeds a predetermined magnitude threshold;
       ii) whether a preponderance of substantially adjacent channels have approximately the same instantaneous frequency;
    c) producing a plurality of primary feature sequences, $SYNCH_k[n]$, which is set to $A_k[n]$ when said conditions are met and zero when they are not met.

11. The method for analyzing the stimulus waveform of claim 1 wherein the step of detecting secondary features comprises the comparison of patterns of said sequences of primary features with a stereotypical pattern of said sequences of primary features resulting from a human glottal pulse stimulus waveform.

12. The method of claim 11 wherein the step of detecting secondary features resulting from a glottal pulse stimulus waveform comprises:
   a) producing from said simulated cochlea a plurality of primary feature sequences, $IMPULSE_k[n]$, where channel index k corresponds to location along said simulated cochlea and n corresponds to discrete-time index;
   b) forming an impulse summation by adding the values of $IMPULSE_k[n]$ for all channels over a predetermined interval of time around a selected time index $n_o$;
   c) determining for said selected time index $n_o$ whether the following condition is met, representing the stereotypical response pattern for a glottal pulse stimulus waveform:
      i) whether said impulse summation exceeds a predetermined threshold;
   d) producing a secondary feature sequence, $PPULSE[n]$, which is set to one when said condition is met and zero when it is not met.

13. The method for analyzing the stimulus waveform of claim 1 wherein the step of detecting secondary features comprises the comparison of said sequences of primary features with a stereotypical pattern of said sequences of primary features resulting from a human vowel stimulus waveform.

14. The method of claim 13 wherein the step of detecting secondary features resulting from a human vowel stimulus waveform comprises:
   a) producing from said simulated cochlea a plurality of primary feature sequences, $IMPULSE_k[n]$ and $SYNCH_k[n]$, where channel index k corresponds to location along said simulated cochlea and n corresponds to discrete-time index;
   b) determining for each selected time index $n_o$ whether the following conditions are met, representing the stereotypical response pattern for a human vowel stimulus waveform:
      i) whether in a predetermined interval of time preceding $n_o$ the value of $IMPULSE_k[n]$ is non-zero;
      ii) whether the value of $SYNCH_k[n_o]$ is non-zero;
   c) producing a plurality of secondary feature sequences, $FORM_k[n]$, which is set to $SYNCH_k[n]$ when said conditions are met and zero when they are not met.

15. The method of claim 14 wherein the plurality of primary feature sequences $SYNCH_k[n]$ is replaced by a plurality of primary feature sequences $AVG\_SYNCH_k[n]$ produced by an averaging filter.

16. The method for analyzing the stimulus waveform of claim 1 wherein the step of producing an output representation comprises the comparison of said sequences of secondary features with a stereotypical pattern of said sequences of secondary features resulting from a human vowel stimulus waveform.

17. The method of claim 16 wherein the step of producing an output representation resulting from a human vowel stimulus waveform comprises:
   a) producing from said simulated cochlea a plurality of secondary feature sequences, $FORM_k[n]$, where channel index k corresponds to location along said simulated cochlea and n corresponds to discrete-time index;
   b) determining for each selected channel index $k_o$ and each selected time index $n_o$ whether the following condition is met, representing the stereotypical response pattern for a human vowel stimulus waveform:
      i) whether the value of the formant sequence $FORM_k[n]$ is maximum at $k_o$ and decreases for substantially adjacent channels;
   c) producing a plurality of output representation sequences, $LFORM_k[n]$, which is set to $FORM_k[n]$ when said condition is met and zero when it is not met.

18. The method for analyzing the stimulus waveform of claim 1 wherein the step of processing said stimulus waveform by said signal-processing means comprises:
   a) converting the stimulus waveform by means of a signal converter to form a discrete-time input sequence p[n], where n is the discrete-time index;
   b) segmenting said input sequence into frames $p_i[n]$ of predetermined length N;
   c) computing a discrete Fourier transform, $P_i[l]$, of each frame of said input sequence, with index l corresponding to discrete Fourier frequency;
   d) providing $H_k[l]$, the filter response function of said simulated cochlea, with channel index k corresponding to location along said simulated cochlea;
   e) multiplying $P_i[l]$ by $H_k[l]$ to form $X_{ki}[l]$;
   f) constructing a Hilbert transform sequence, $Z_{ki}[l]$, by setting to zero the last N/2 points of $X_{ki}[l]$ and multiplying the first N/2 points by two;
   g) computing an inverse discrete Fourier transform of $Z_{ki}[l]$ to form frames of a complex filter response sequence $z_{ki}[n]$;
   h) assembling frames of $z_{ki}[n]$ to form a complex cochlear-filtered response sequence $z_k[n]$;
   i) computing the instantaneous magnitude sequence, $A_k[n]$, and the instantaneous phase sequence, $\Phi_k[n]$, from the complex sequence $z_k[n]$; and
   j) providing a plurality of output sequences comprising said instantaneous magnitude sequence and said instantaneous phase sequence for each said channel index k.

19. The method for analyzing the stimulus waveform of claim 1 wherein the step of processing said stimulus waveform by said auditory model means comprises:
   a) producing from said simulated cochlea a plurality of output sequences comprising an instantaneous magnitude sequence, $A_k[n]$, and an instantaneous phase sequence, $\Phi_k[n]$, where channel index k corresponds to location along said simulated cochlea and n corresponds to discrete-time index;
   b) computing an instantaneous frequency sequence, $f_k[n]$, from the scaled difference of said $\Phi_k[n]$ sequences for two sequential values of n;
   c) providing a plurality of output sequences comprising said instantaneous magnitude sequence and said instantaneous frequency sequence for each said channel index k.

20. An apparatus for analyzing a stimulus waveform comprising:
   a) a signal processing means which simulates the response properties of the human cochlea by supplying a plurality of output waveforms each of which corresponds to the response of said simulated cochlea at a selected location along its length;
   b) means for applying said stimulus waveform to the input of said simulated cochlea;
   c) filtering means in said signal processing means for producing a plurality of output waveforms and their spatial and time derivatives at selected locations along the length of said simulated cochlea;

d) first pattern matching means for comparing said output waveforms and their spatial and time derivatives with stereotypical output waveforms and their spatial and time derivatives to provide sequences of primary features of said stimulus waveform;

e) means for producing a plurality of said sequences of said primary features at selected locations as said stimulus waveform is propagated along said simulated cochlea;

f) second pattern matching means for comparing said sequences of primary features with stereotypical patterns of said primary features to provide a sequence of secondary features of said stimulus waveform;

g) means for producing a plurality of said sequences of said secondary features; and h) third pattern matching means for detecting combined spatial and temporal relationships of said primary and secondary feature sequences to produce an output representation comprising one or more sequences.

21. The apparatus as described in claim 20 wherein the input stimulus waveform is an acoustic stimulus such as sound or speech.

22. The apparatus as described in claim 20 wherein said filtering means comprises a plurality of band-pass filters, each of said filters substantially matching the frequency response characteristic at a selected location along said simulated cochlea, with the timing and phase characteristics of the output of the ensemble of said filters substantially matching waveform propagation characteristics of the human cochlea.

23. The apparatus as described in claim 20 wherein said selected locations are equally spaced along the length of said simulated cochlea, approximately corresponding to logarithmic spacing of the center frequencies of said band-pass filter channels.

24. The apparatus of claim 20 wherein said first pattern matching means includes means for comparing said output waveforms and their spatial and time derivatives with stereotypical output waveforms and their spatial and time derivatives resulting from an impulsive stimulus waveform.

25. The apparatus of claim 20 wherein said first pattern matching means includes means for comparing said output waveforms and their spatial and time derivatives with stereotypical output waveforms and their spatial and time derivatives resulting from a sinusoidal stimulus waveform.

26. The apparatus of claim 20 wherein said second pattern matching means includes means for comparing patterns of said sequences of primary features with a stereotypical pattern of said sequences of primary features resulting from a human glottal pulse stimulus waveform.

27. The apparatus of claim 20 wherein said second pattern matching means includes means for comparing said sequences of primary features with a stereotypical pattern of said sequences of primary features resulting from a human vowel stimulus waveform.

28. The apparatus of claim 20 wherein said third pattern matching means includes means for comparing said sequences of secondary features with a stereotypical pattern of said sequences of secondary features resulting from a human vowel stimulus waveform.

* * * * *